(12) United States Patent
Tomaras et al.

(10) Patent No.: US 11,099,121 B2
(45) Date of Patent: Aug. 24, 2021

(54) CUVETTE DEVICE FOR DETERMINING ANTIBACTERIAL SUSCEPTIBILITY

(71) Applicant: BacterioScan Inc., St. Louis, MO (US)

(72) Inventors: Andrew P. Tomaras, Wildwood, MO (US); Theodore S. McMinn, St. Louis, MO (US); Edouard F. Trincal, St. Louis, MO (US)

(73) Assignee: BacterioScan Inc., St. Louis, MO (US)

( * ) Notice: Subject to any disclaimer, the term of this patent is extended or adjusted under 35 U.S.C. 154(b) by 0 days.

(21) Appl. No.: 16/781,998

(22) Filed: Feb. 4, 2020

(65) Prior Publication Data
US 2020/0249148 A1   Aug. 6, 2020

Related U.S. Application Data

(60) Provisional application No. 62/801,492, filed on Feb. 5, 2019.

(51) Int. Cl.
*G01N 21/03* (2006.01)
*G01N 21/51* (2006.01)
*G01N 15/06* (2006.01)

(52) U.S. Cl.
CPC ......... *G01N 21/0303* (2013.01); *G01N 21/51* (2013.01); *G01N 2015/0693* (2013.01);
(Continued)

(58) Field of Classification Search
CPC .. G01N 21/0303; G01N 21/51; G01N 21/274; G01N 21/05; G01N 33/49;
(Continued)

(56) References Cited

U.S. PATENT DOCUMENTS 3,504,376 A    3/1970   Bednar
3,627,424 A   12/1971   Dorman
(Continued)

FOREIGN PATENT DOCUMENTS

DE          10128978        12/2002
EP           0320154         6/1989
(Continued)

OTHER PUBLICATIONS

Murray, "Light-scattering methods for antibiotic sensitivity tests," J Clin Pathol, 1980, vol. 33, pp. 995-1001, 8 pages.
(Continued)

*Primary Examiner* — Michael P Stafira
(74) *Attorney, Agent, or Firm* — CreatiVenture Law, LLC; Dennis J M Donahue, III; Kevin C. Staed

(57) ABSTRACT

The present invention is a cuvette assembly for use in optically measuring at least one characteristic of particles within a plurality of liquid samples. The cuvette assembly includes a unitary body made of a single type of transparent material. The unitary body includes a plurality of optical chambers for receiving the liquid sample, an entry side wall for allowing transmission of an input light beam into the respective liquid sample, and an exit side wall for transmitting a forward scatter signal caused by the particles within the respective liquid sample. Each of the plurality of optical chambers is separated by internal walls of the unitary body.

20 Claims, 12 Drawing Sheets

(52) U.S. Cl.
CPC ............... *G01N 2021/0357* (2013.01); *G01N 2021/513* (2013.01); *G01N 2201/04* (2013.01)

(58) Field of Classification Search
CPC ......... G01N 2021/513; G01N 21/6458; G01N 21/6428; G01N 21/03; G01N 21/31; G01N 2201/062; G01N 1/30; G01N 21/17; G01N 21/255; G01N 21/645; G01N 2201/0634; G01N 2201/12; G01N 15/1012; G01N 15/1475; G01N 2015/0038; G01N 2021/4707; G01N 21/27; G01N 2201/061; G01N 33/487; G01N 33/492; G01N 2015/1018; G01N 2021/0321; G01N 2021/0389; G01N 2021/1738; G01N 2021/6441; G01N 21/253; G01N 2201/0638; G01N 2333/70589; G01N 2333/70596; G01N 33/5005; G01N 33/54373; G01N 33/56966; G01N 33/56972; G01N 35/025; G01N 15/1463; G01N 2015/1486; G01N 2021/0346; G01N 2021/6419; G01N 2035/00148; G01N 21/251; G01N 21/59; G01N 21/6408; G01N 21/78; G01N 2201/0415; G01N 31/22; G01N 33/18; G01N 33/182; G01N 15/0211; G01N 2015/0053; G01N 2021/6432; G01N 2021/7786; G01N 2201/0231; G01N 2201/068; G01N 2469/10; G01N 33/4905; G01N 33/4925; G01N 33/553; G01N 35/00029; G01N 15/0227; G01N 15/06; G01N 15/1404; G01N 15/1434; G01N 15/1436; G01N 15/147; G01N 1/312; G01N 2001/302; G01N 2015/0693; G01N 2015/1452; G01N 2015/149; G01N 2015/1493; G01N 2021/0357; G01N 2021/154; G01N 2021/4726; G01N 2021/6482; G01N 2035/00039; G01N 2035/00138; G01N 2035/0094; G01N 2035/0444; G01N 2035/1076; G01N 21/0332; G01N 21/13; G01N 21/15; G01N 21/783; G01N 2201/04; G01N 2201/0683; G01N 2203/0087; G01N 2203/0089; G01N 27/07; G01N 27/44782; G01N 33/48707; G01N 33/48785; G01N 33/53; G01N 33/5308; G01N 33/582; G01N 35/00069; G01N 35/0099; G01N 35/04; G01N 3/08; G01N 13/00; G01N 15/0205; G01N 15/1429; G01N 15/1456; G01N 15/1459; G01N 1/10; G01N 1/28; G01N 2015/0073; G01N 2015/008; G01N 2015/0084; G01N 2015/0092; G01N 2015/0277; G01N 2015/03; G01N 2015/0681; G01N 2015/0687; G01N 2015/1006; G01N 2015/1402; G01N 2015/1477; G01N 2015/1497; G01N 2021/0307; G01N 2021/036; G01N 2021/0364; G01N 2021/0367; G01N 2021/0378; G01N 2021/0385; G01N 2021/135; G01N 2021/216; G01N 2021/3144; G01N 2021/3148; G01N 2021/3155; G01N 2021/7736; G01N 2035/00049; G01N 2035/00089; G01N 2035/00237; G01N 2035/00524; G01N 2035/00752; G01N 2035/0093; G01N 2035/0046; G01N 2035/0465; G01N 2035/0491; G01N 2035/1086; G01N 21/01; G01N 21/07; G01N 21/3151; G01N 21/3577; G01N 21/53; G01N 21/6452; G01N 21/77; G01N 2201/0245; G01N 2015/0065; G01N 2021/1706; G01N 21/1702; G01N 21/39; G01N 21/4795; G01N 21/6445; G01N 21/6489; G01N 2201/06113; G01N 2201/0633; G01N 2291/0256; G01N 2291/106; G01N 29/2418; G01N 33/551; G01N 21/7703; G01N 21/82; G01N 2201/022; G01N 2201/025; G01N 2201/0256; G01N 2201/0612; G01N 2201/0627; G01N 2201/0636; G01N 2201/0642; G01N 2201/127; G01N 2201/12715; G01N 27/27; G01N 27/44721; G01N 27/44726; G01N 33/54366; G01N 33/54386; G01N 33/569; G01N 33/56911; G01N 35/00663; G01N 35/00693; G01N 35/00712; G01N 35/00732; G01N 35/0092; G01N 35/026; G01N 35/1002; G01N 21/648; G01N 21/6486; G01N 21/774; G01N 23/205; G01N 2021/6439; G01N 21/35; G01N 21/3563; G01N 21/9501; G01B 11/002; G01B 11/25; G01B 11/2513; G01B 11/00; G01B 11/14; G01B 11/167; G01B 11/2518; G01B 11/2522; G01B 11/2527; G01B 2210/56; G01B 2290/45; G01B 9/02015; G01B 9/02027; G01B 9/02082; G01B 9/02097; G01J 3/0256; G01J 3/4531; G01J 3/0208; G01J 3/0259; G01J 3/18; G01J 3/42; G01J 3/453; G01J 3/4532; G01J 2003/1213; G01J 3/021; G01J 3/108; G01J 3/36; G01J 1/0407; G01J 1/44; G01J 2003/423; G01J 3/0205; G01J 3/0224; G01J 3/0229; G01J 3/0291; G01J 3/0294; G01J 3/10; G01J 3/1838; G01J 3/24; G01J 3/2803; G02B 21/16; G02B 5/1857; G02B 6/34; G02B 21/0032; G02B 21/006; G02B 21/008; G02B 21/06; G02B 21/367; G02B 21/0048; G02B 26/0833; G02B 27/0172; G02B 27/46; G02B 5/18; G02B 5/1828; G02B 2006/12135; G02B 21/0056; G02B 21/0076; G02B 27/0025; G02B 27/0944; G02B 27/4211; G02B 27/4233; G02B 27/58; G02B 5/1814; G02B 5/1838; G02B 6/124; G02B 6/4221; G02B 13/0025; G02B 13/006; G02B 13/0085; G02B 1/002; G02B 1/11; G02B 2027/0125; G02B 2027/0178; G02B 23/2407; G02B 27/0103; G02B 27/0927; G02B 27/095; G02B 27/10; G02B 27/1086; G02B 27/286; G02B 27/42; G02B 27/4261; G02B 27/4277; G02B 3/0025; G02B 3/0031; G02B 3/0068; G02B 3/0075; G02B 5/003; G02B 5/008; G02B 5/1852; G02B 5/1866; G02B 5/281; G02B 5/283; G02B 5/30; G02B 6/00; G02B 6/0016; G02B 6/0036; G02B 6/0058; G02B 6/0061; G02B 6/0073; G02B 6/0078; G02B 6/02042; G02B 6/024; G02B 6/10; G02B 6/14; G02B 6/262; G02B 6/2726; G02B 6/42; G02B
6/4246; G02B 6/43; G02B 7/022; G02B
13/0005; G02B 13/0015; G02B 13/009;
G02B 19/0095; G02B 1/10; G02B
2006/12107; G02B 2006/12166; G02B
2006/1219; G02B 2027/0118; G02B
27/0174; G02B 21/002; G02B 21/0044;
G02B 21/0092; G02B 21/02; G02B
21/244; G02B 21/361; G02B 23/12;
G02B 23/26; G02B 26/101; G02B
26/105; G02B 26/106; G02B 27/00;
G02B 27/0068; G02B 27/0075; G02B
27/0081; G02B 27/0101; G02B 27/0905;
G02B 27/0977; G02B 27/0988; G02B
27/1006; G02B 27/1073; G02B 27/28;
G02B 27/283; G02B 27/30; G02B
27/4205; G02B 27/4222; G02B 27/4238;
G02B 27/4244; G02B 27/425; G02B
27/4272; G02B 27/48; G02B 30/20;
G02B 30/30; G02B 3/06; G02B 5/0891;
G02B 5/10; G02B 5/1809; G02B 5/1842;
G02B 5/1847; G02B 5/1871; G02B
5/208; G02B 5/3041; G02B 5/3083;
G02B 5/32; G02B 6/002; G02B 6/0023;
G02B 6/0033; G02B 6/0035; G02B
6/0038; G02B 6/0043; G02B 6/005;
G02B 6/0053; G02B 6/0055; G02B
6/0056; G02B 6/0065

See application file for complete search history.

(56)  References Cited

U.S. PATENT DOCUMENTS

| | | | |
|---|---|---|---|
| 3,713,775 A | | 1/1973 | Schmitz |
| 3,759,374 A | * | 9/1973 | Helger ............. G01N 21/03 206/431 |
| 3,832,532 A | | 8/1974 | Praglin |
| 3,928,140 A | | 12/1975 | Wyatt |
| 4,066,360 A | | 1/1978 | Breddin |
| 4,101,383 A | | 7/1978 | Wyatt |
| 4,113,386 A | | 9/1978 | Lepper, Jr. |
| 4,119,407 A | | 10/1978 | Goldstein |
| 4,265,538 A | | 5/1981 | Wertheimer |
| 4,577,970 A | | 3/1986 | Meserol |
| 4,754,613 A | | 7/1988 | Brito |
| 4,874,102 A | | 10/1989 | Jessop |
| 4,895,446 A | | 1/1990 | Maldari |
| 5,139,031 A | | 8/1992 | Guirguis |
| 5,187,368 A | | 2/1993 | Galante |
| 5,212,667 A | | 5/1993 | Tomlinson, Jr. |
| 5,351,118 A | | 9/1994 | Spinell |
| 5,416,329 A | * | 5/1995 | Sonne ............... G01T 1/2045 250/328 |
| 5,616,923 A | | 4/1997 | Rich |
| 5,693,944 A | | 12/1997 | Rich |
| 5,969,814 A | | 10/1999 | Barber |
| 5,989,499 A | | 11/1999 | Catanzariti |

| | | | |
|---|---|---|---|
| 6,091,483 A | | 7/2000 | Guirguis |
| 6,230,045 B1 | | 5/2001 | Hoogenraad |
| 6,333,008 B1 | | 12/2001 | Leistner |
| 6,573,992 B1 | | 6/2003 | Drake |
| 6,861,230 B1 | | 3/2005 | Murphy |
| 7,430,046 B2 | | 9/2008 | Jiang |
| 7,961,311 B2 | | 6/2011 | Weichselbaum |
| 8,339,601 B2 | | 12/2012 | Weichselbaum |
| 9,579,648 B2 | | 2/2017 | Marshall |
| 10,006,857 B2 | | 6/2018 | Marshall |
| 10,040,065 B2 | | 8/2018 | Marshall |
| 10,048,198 B2 | | 8/2018 | Regelman |
| 10,065,184 B2 | | 9/2018 | Marshall |
| 10,233,481 B2 | | 3/2019 | Marshall |
| 2001/0048899 A1 | * | 12/2001 | Marouiss ............. G01N 35/028 422/505 |
| 2003/0048433 A1 | | 3/2003 | Desjonqueres |
| 2004/0070756 A1 | | 4/2004 | Rastopov |
| 2004/0185552 A1 | | 9/2004 | Grinner |
| 2004/0238746 A1 | | 12/2004 | Dreyer |
| 2005/0148085 A1 | | 7/2005 | Larsen |
| 2006/0063146 A1 | | 3/2006 | Larsen |
| 2006/0109476 A1 | | 5/2006 | Werner |
| 2006/0256338 A1 | | 11/2006 | Gratton |
| 2007/0155017 A1 | | 7/2007 | Wyatt |
| 2007/0159619 A1 | | 7/2007 | Chu |
| 2007/0195324 A1 | | 8/2007 | Adams |
| 2007/0206203 A1 | | 9/2007 | Trainer |
| 2007/0211251 A1 | | 9/2007 | Weischselbaum |
| 2007/0253042 A1 | | 11/2007 | Szarvas |
| 2008/0106737 A1 | | 5/2008 | Weichselbaum |
| 2008/0283091 A1 | | 11/2008 | Steiner |
| 2008/0293091 A1 | | 11/2008 | Kanipayor |
| 2010/0092996 A1 | * | 4/2010 | Verschuren .......... G01N 21/553 435/7.1 |
| 2010/0277734 A1 | | 11/2010 | Weichselbaum |
| 2012/0099098 A1 | * | 4/2012 | Webster ................. G01N 21/03 356/51 |
| 2013/0089476 A1 | | 4/2013 | Weichselbaum |
| 2015/0160119 A1 | * | 6/2015 | Marshall ............... G01N 21/51 435/287.6 |
| 2016/0103061 A1 | * | 4/2016 | Weber ................... B01L 3/5082 356/246 |

FOREIGN PATENT DOCUMENTS

| | | |
|---|---|---|
| EP | 1136563 | 9/2001 |
| GB | 1515681 | 6/1978 |
| GB | 2412166 | 9/2005 |
| WO | WO 00/09981 | 2/2000 |
| WO | WO 00/66763 | 11/2000 |
| WO | WO 2006/018839 A2 | 2/2006 |
| WO | WO 2013/070948 A1 | 5/2013 |
| WO | WO 2013/153371 A1 | 10/2013 |

OTHER PUBLICATIONS

Rajnovic et al., "Fast phage detection and quantification: An optical density-based approach," PLOS ONE, May 9, 2019, pp. 1-14, 14 pages.

* cited by examiner

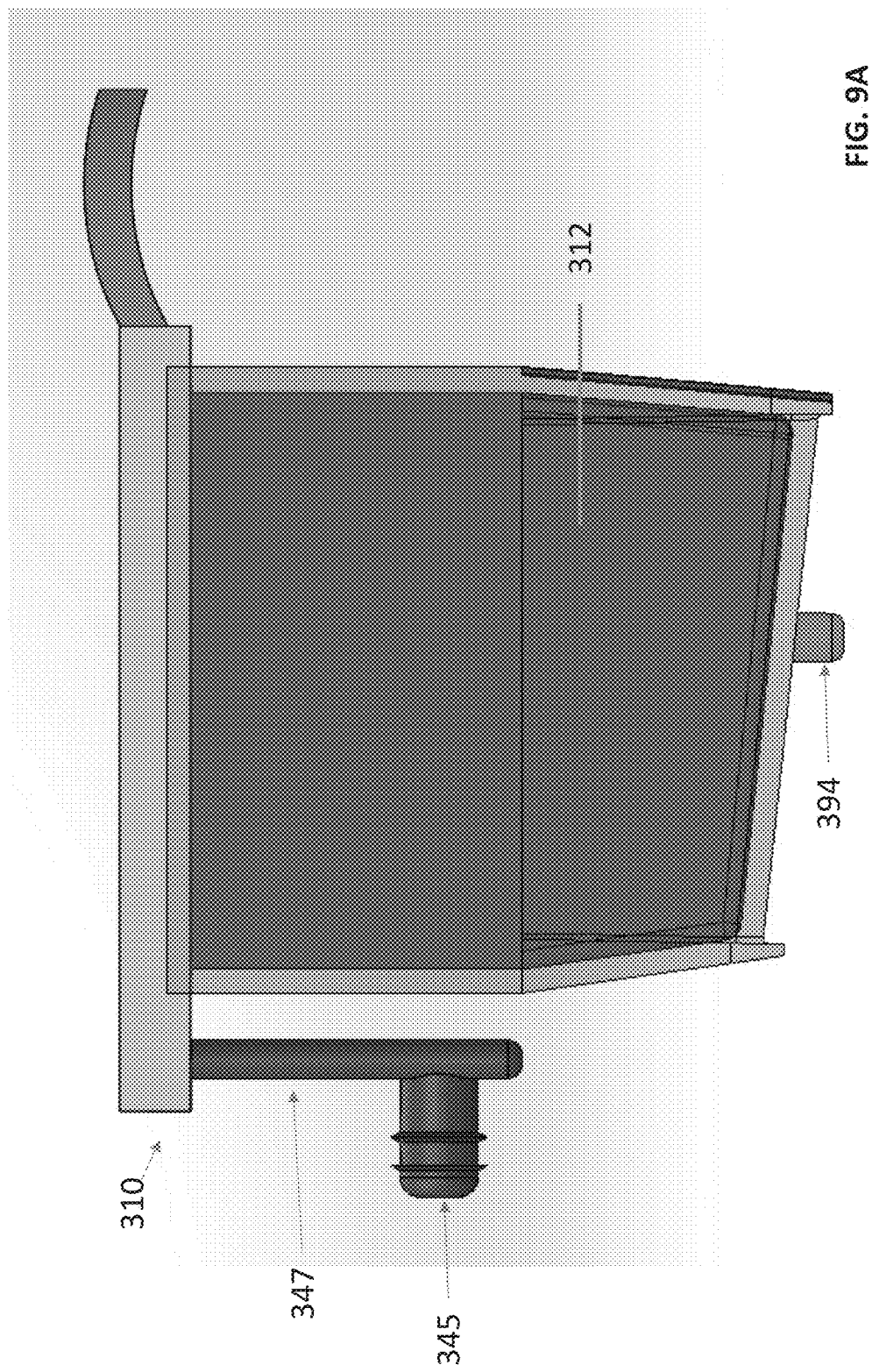

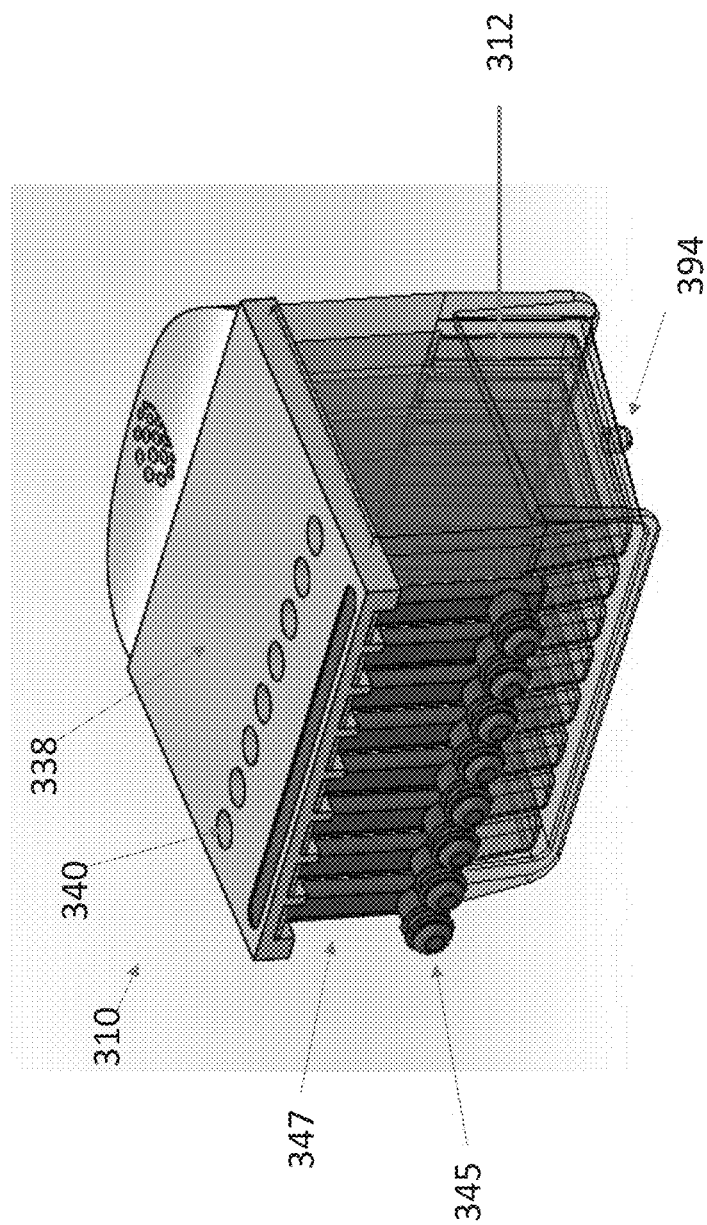

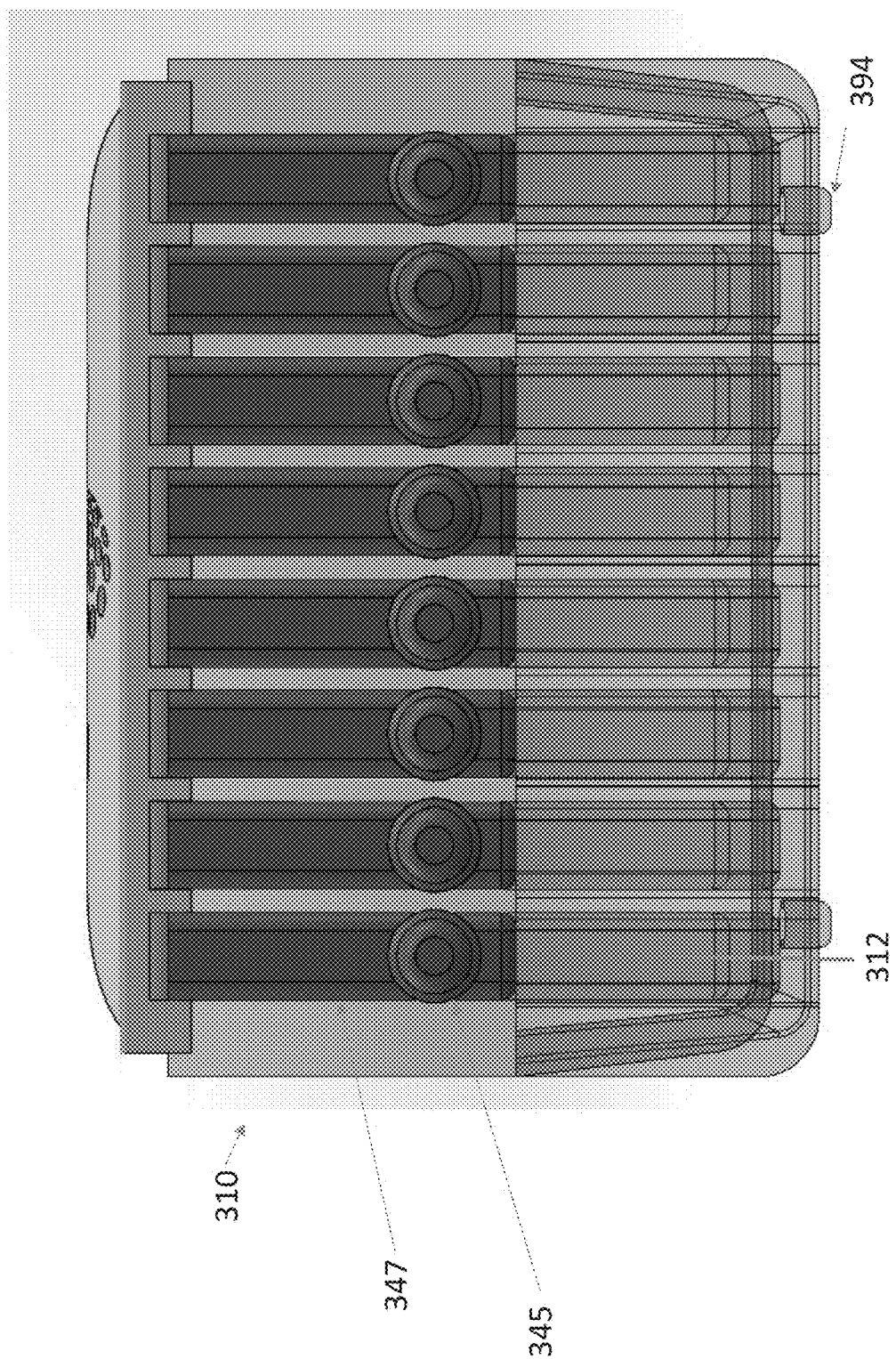

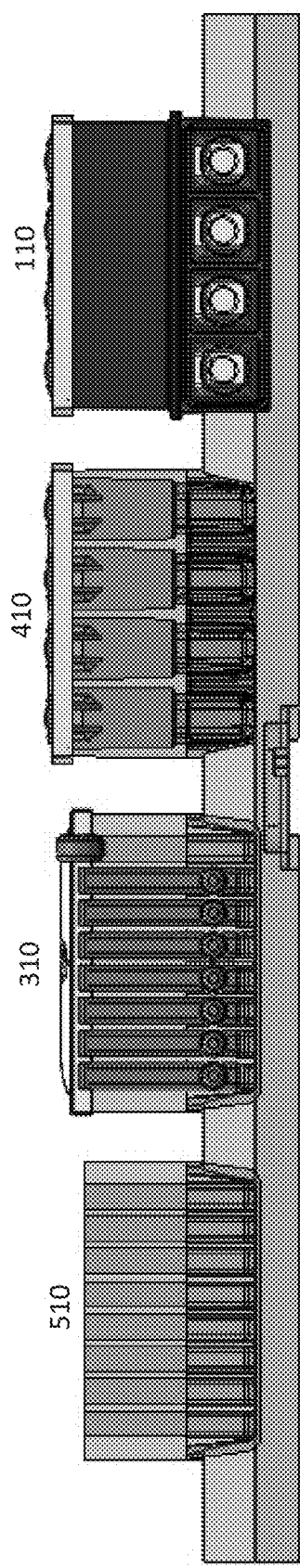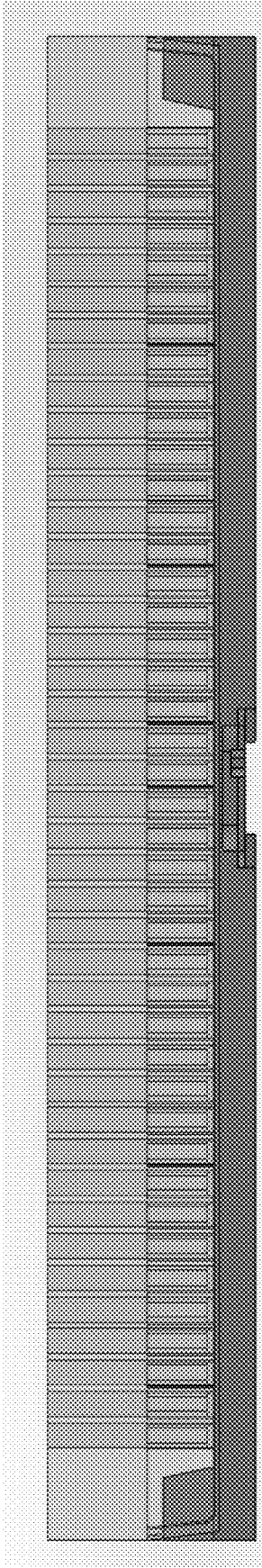

CUVETTE DEVICE FOR DETERMINING ANTIBACTERIAL SUSCEPTIBILITY

CROSS REFERENCE TO RELATED APPLICATIONS

This application claims priority to and the benefit of U.S. Provisional Patent Application No. 62/801,492, filed Feb. 5, 2019, which is incorporated herein by reference in its entirety.

COPYRIGHT

A portion of the disclosure of this patent document may contain material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to the field of optical measurements of liquid samples containing bacteria. Specifically, the present invention relates to a cuvette device having multiple chambers for containing liquid samples that will be evaluated by optical measurements.

BACKGROUND OF THE INVENTION

Many applications in the field of analytical research and clinical testing utilize optical methods for analyzing liquid samples. Among those methods are absorbance, turbidity, fluorescence/luminescence, and optical scattering measurements. Optical laser scattering is one of the most sensitive methods, but its implementation can be very challenging, especially when analyzing biological samples in which suspended particles are relatively transparent in the medium. In this case, most of the scattering process occurs in the forward direction near the incident laser beam. To detect this forward scattering signal, high extinction of the incident beam is required.

One particle that often requires evaluation within a liquid is bacteria. The presence of bacteria is often checked with biological liquids, such as urine, amniotic, pleural, peritoneal and spinal liquids. In one common analytical method, culturing of the bacteria can be time-consuming and involve the use of bacterial-growth plates placed within incubators. Normally, laboratory results take several days to determine whether the subject liquid is infected with bacteria.

In some systems, cuvettes have been used to receive liquid samples that are then subjected to the optical measurement by transmission of an input beam through the cuvette and observation of the forward scatter signals. These devices have been used relative to the detection of bacteria within the liquid. However, the cuvettes are not conducive to mass production for commercial use. Nor do these prior art cuvettes have user-friendly features that permit for ease of use by operators, including the insertion of the liquid samples into the multiple chambers.

Accordingly, there is a need for an improved cuvette that is easy to mass produce, permits easy use by the operator, and more readily delivers the liquid sample into the optical chamber.

SUMMARY OF THE INVENTION

The present invention is a cuvette assembly for use in optically measuring at least one characteristic of particles within a plurality of liquid samples. The cuvette assembly includes a unitary body made of a single type of transparent material. The unitary body includes a plurality of optical chambers for receiving the liquid sample, an entry side wall for allowing transmission of an input light beam into the respective liquid sample, and an exit side wall for transmitting a forward scatter signal caused by the particles within the respective liquid sample. Each of the plurality of optical chambers is separated by internal walls of the unitary body.

In another aspect, the invention is a modular optical measuring instrument for determining bacteria concentration in a plurality of fluid samples. The instrument includes a housing with a substantially light-tight enclosure, and a light source within the housing for providing an input beam for transmission into the input windows of the fluid containers and though the corresponding fluid samples. The input beam creates a forward-scatter signal associated with the concentration of bacteria. At least one sensor within the housing detects the forward-scatter signal exiting from the output windows. A registration platform within the housing receives at least a first type of cuvette and a second type of cuvette that is different from the first type of cuvette. The modularity of the system is provided, in part, by the registration platform that receives different types of cuvettes, which differ, for example, in size and/or numbers of fluid/optical chambers. Thus, the same system can be used with different cuvette configurations that are better suited for different applications (e.g., chemo-effector related analysis, bacteriophage-related analysis, crystal-violet related analyses).

The present invention also contemplates a method of detecting a microorganism in a fluid sample using a specimen collection device. The method includes placing a portion of the fluid sample in each of a plurality of fluid containers associated with the specimen collection device. A first fluid container includes crystal violet disposed therein, while a second fluid container lacks crystal violet. The method further includes, by use of forward-scatter signals exiting the first and second fluid containers, determining whether the fluid sample contains Gram-positive organisms or Gram-negative organisms by a comparison of, over a period of time, forward-scatter signals exiting the first fluid container and the second fluid container. Changes or a lack of changes to the forward scatter signals over a period of time are indicative of growth of organisms.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 9A is a side view of an alternative cuvette for sample testing within the optical measurement instrument of FIGS. 1A and 1B.

FIG. 9B is a perspective view of the alternative cuvette of FIG. 9A.

FIG. 9C is an end view of the alternative cuvette of FIG. 9A.

FIGS. 12A and 12B illustrate a comparison of the large alternative cuvette of FIG. 11 and the smaller cuvettes of the previous figures.

Figure 1A:
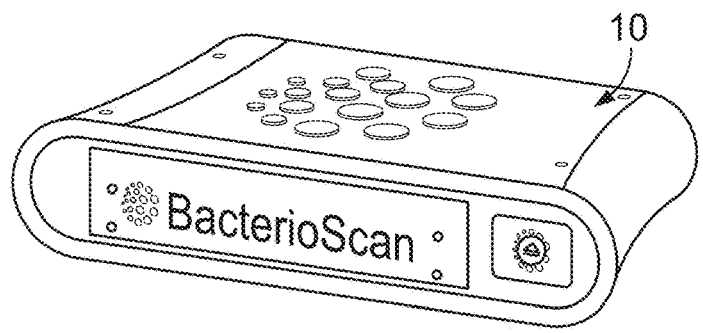
FIG. 1A illustrates an optical-measuring instrument that is capable of incubating fluid samples by having a controlled internal heating system.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1A illustrates an optical measuring device 10 (manufactured by the assignee of the present application as the BacterioScan 216 instrument) that can rapidly detect and quantify the concentration of bacteria in a fluid sample. As discussed in more detail below, the instrument 10 includes on-board incubation, such that reagents to enhance growth are not necessarily needed (although they can be used). The instrument 10 uses laser-scattering technology to quantify bacteria growth in fluid sample sizes as small as 1 ml. In particular, the instrument 10 transmits a laser beam through a fluid sample, and measures the scatter signal caused by the bacteria in the fluid sample, preferably through a forward-scattering measurement technique. The on-board incubation provides for fluid sample temperatures ranging from room temperature up to 42° C. (or higher). The instrument 10 permits for a range of optical measurement intervals over a period of time (e.g., 1-6 hours, preferably 1-3 hours) to determine the growth and concentration of the bacteria within the liquid samples during incubation. The optical measuring instrument 10 can detect and count bacteria by various techniques that are generally described in U.S. Pat. Nos. 7,961,311 and 8,339,601, both of which are commonly owned and are herein incorporated by reference in their entireties.

Figure 1B:
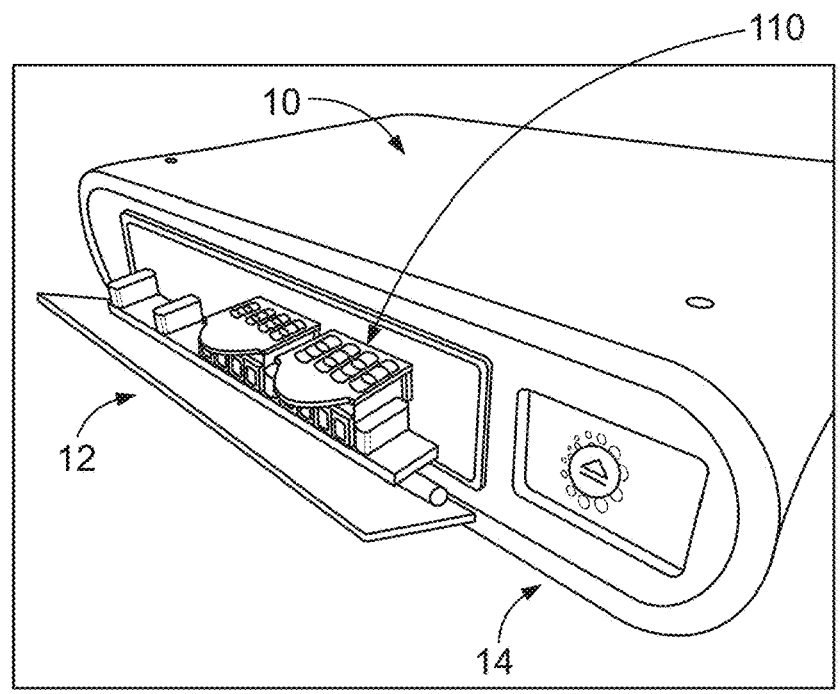
FIG. 1B illustrates the cuvettes of FIG. 2 being placed and registered within the optical-measuring instrument of FIG. 1A.

FIG. 1B illustrates cuvette assemblies 110 being inserted into the optical measurement instrument 10 of FIG. 1A. To do so, a front door 12 on the optical measurement instrument 10 is opened and the cuvette assemblies 110 are placed on a registration and orientation plate or platform 210 (See FIG. 8) such that the laser-input window and output-signal window of each cuvette (FIGS. 6-7) are substantially registered within the optical measurement instrument 10, permitting periodic optical measurements to be taken of each sample. As shown, the optical measurement instrument 10 may include up to four cuvettes 110, such that 16 different samples can be tested periodically through the optical measurement instrument 10.

The optical measuring instrument 10 includes a display device 14 that provides information regarding the tests and/or fluid samples. For example, the display device 14 may indicate the testing protocol being used for the samples (e.g., time and temperature) or provide the current temperature within the instrument 10. Preferably, the display device 14 also includes an associated touchscreen input (or a different set of input buttons can be provided) that allows a user to perform some of the basic functions of the instrument 10, such as a power on/off function, a door open/close function, a temperature increase/decrease function, etc.

Figure 2:
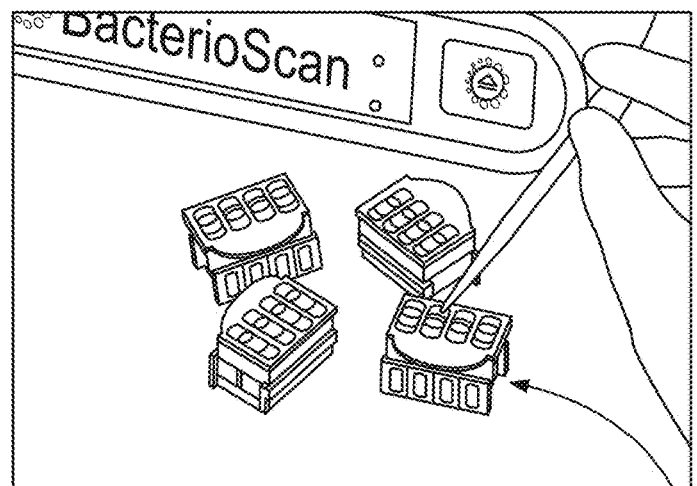
FIG. 2 illustrates four multi-chamber cuvettes that receive fluid samples that are placed in the optical-measuring device of FIGS. 1A and 1B.

FIG. 2 illustrates four cuvettes assemblies 110, each of which has four openings leading to four different chambers that provide for optical measurement of the fluid samples in the four chambers. The optical measurement is preferably a forward-scattering signal measurement caused by bacteria in the fluid sample. The cuvette assemblies 110 are described in more detail in U.S. Pat. No. 9,395,297, titled "Cuvette Assembly Having Chambers for Containing Samples to be Evaluated through Optical Measurement," filed on Dec. 5, 2014, which is commonly owned and is hereby incorporated by reference in its entirety. A brief description of the cuvette assembly 110 is provided below with reference to FIGS. 6-8. The cuvette assemblies 110 can be filled with fluid samples automatically or manually. As shown, the cuvette assemblies 110 are filled through the use of a pipette.

Figure 3:
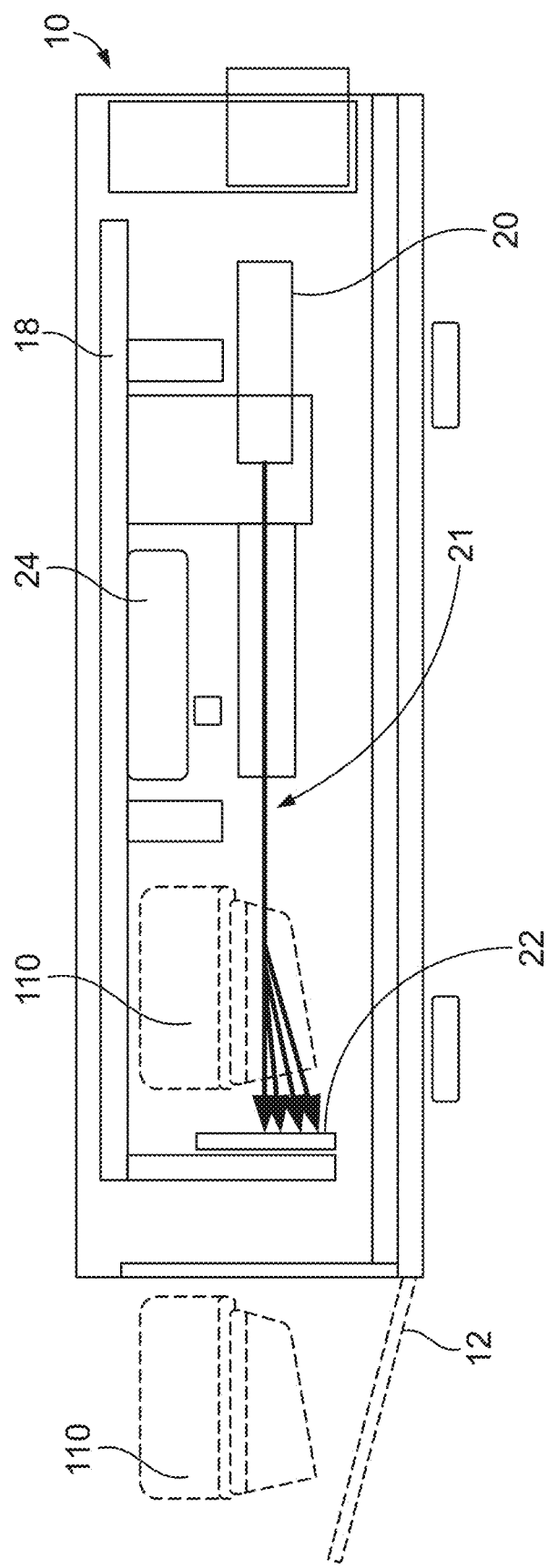
FIG. 3 illustrates a side view of the optical-measuring instrument of FIGS. 1A and 1B.
Figure 4:
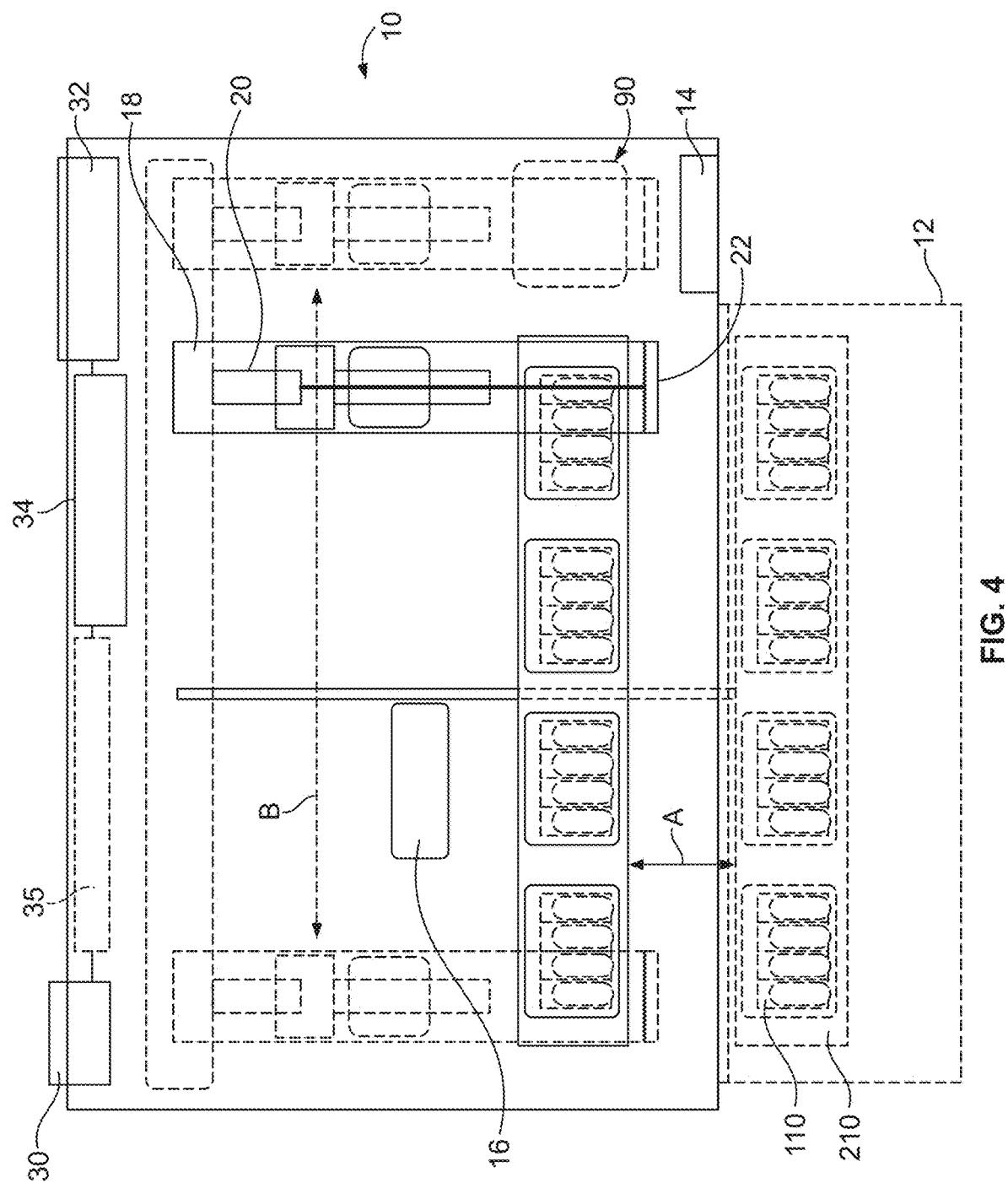
FIG. 4 illustrates a top view of the optical-measuring instrument of FIGS. 1A and 1B.

FIGS. 3-4 illustrate more of the details of the internal structures and components of the optical measurement instrument 10. In particular, as shown best in FIG. 4, the cuvettes assemblies 110 are loaded onto a movable platform 210 (show in detail in FIG. 8) when the door 12 is opened. Once loading is complete, the platform 210 moves inwardly into the instrument 10 and the door 12 is rotated to the closed position, creating a substantially light-tight seal. The door 12 has seals and/or gaskets around it so that the instrument 10 provides a light-tight enclosure to ensure proper signal detection by the sensor 22. As such, the movable platform 210 translates back and forth in the direction of arrow "A" in FIG. 4. The instrument 10 includes a motor 16, such as a motor that operates a gear (e.g., a worm gear) that is actuated to perform the platform movement and the opening and closing of the door 12.

An optical bench 18 is located within the instrument 10. A laser 20 (a light source), which provides an input beam 21, and a sensor 22 are coupled to the optical bench 18 in a fixed orientation. In one embodiment, the laser 20 is a visible wavelength collimated laser diode. In another embodiment the laser 20 is a laser beam delivered from an optical fiber. In yet another embodiment, the laser 20 includes multiple wavelength sources from collimated laser diodes that are combined into a single co-boresighted beam through one of several possible beam combining methods. In another example, the light source 20 is an incoherent narrow wavelength source such as an Argon gas incandescent lamp that is transmitted through one or more pinholes to provide a beam of directionality. A stepper motor 24 provides translation movement in the direction of arrow "B" to the optical bench 18, such that the laser 20 and the sensor 22 can move from side to side so as to be registered in 16 discrete positions that correspond to the 16 samples within the four cuvettes assemblies 110. At each position, the laser 20 is operational and its input beam 21 causes a forward-scatter signal associated with the liquid sample in question. The forward-scatter signal is detected by the sensor 22 and is associated with the bacteria concentration. As explained in more detail below with respect to cuvettes assemblies 110, each sample may undergo some type of filtering within the cuvette assembly 110 and/or outside the cuvette assembly 110 such that unwanted particles are substantially filtered, leaving only (or predominantly only) the bacteria. Alternatively, no filtering may be needed. Due to the incubation feature within the instrument 10, the necessary environment around the cuvette assemblies 110 can be controlled to promote the growth of the bacteria, such that subsequent optical measurements taken by the combination of the laser 20 and the sensor 22 results in a stronger forward-scatter signal indicative of increased bacterial concentration. The instrument 10 includes internal programming that (i) controls the environment around the fluid sample and (ii) dictates the times and/or times-intervals between optical measurements to determine whether the bacteria has grown and, if so, how much the concentration of bacteria has increased. The output of the instrument 10 can be seen on a separate display, as shown in FIGS. 11-12.

Figure 6:
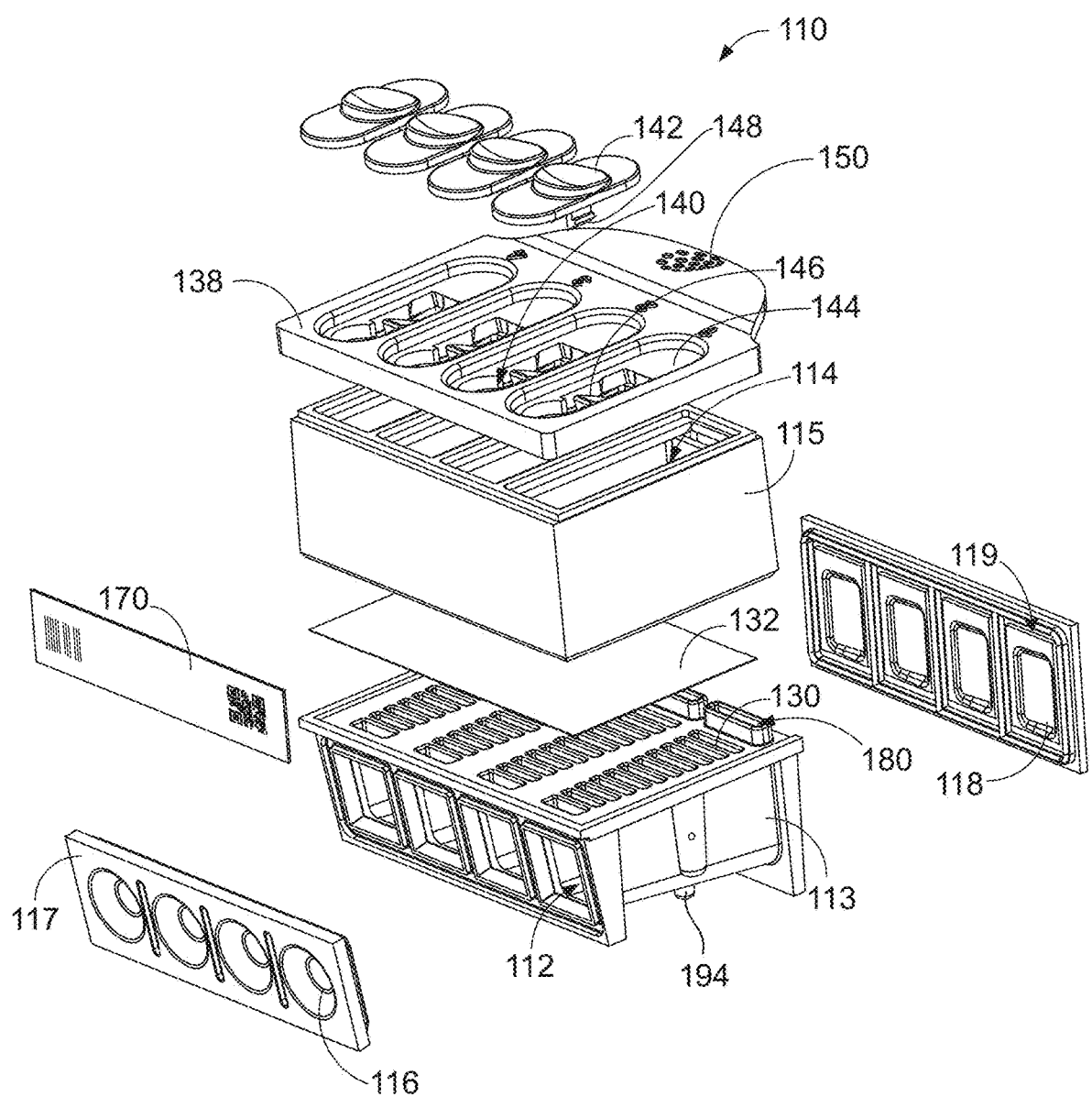
FIG. 6 is an exploded view of one the multi-chamber cuvettes of FIG. 2 that is used with the optical-measuring device of FIGS. 1A and 1B.
Figure 11:
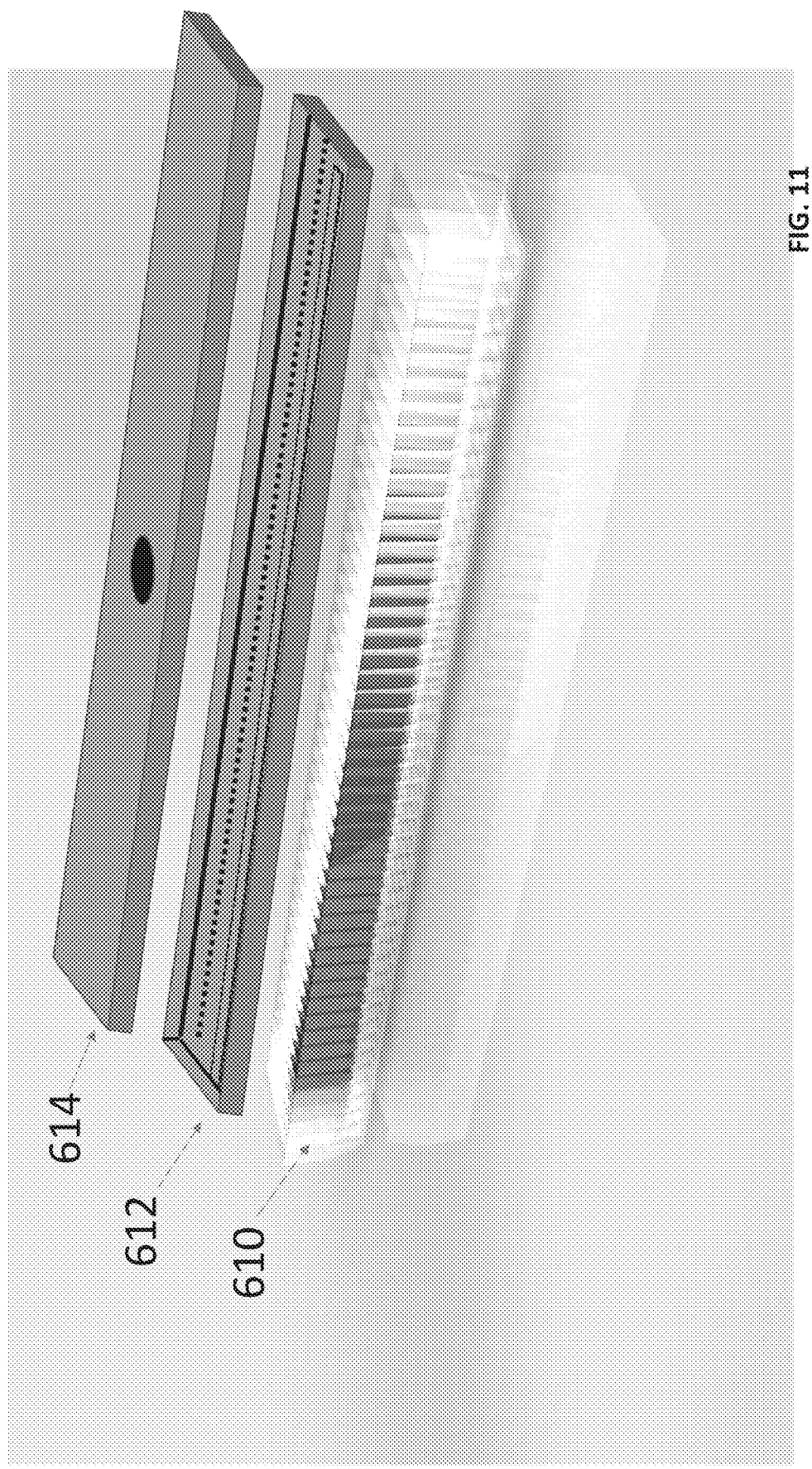
FIG. 11 is an exploded perspective view of large alternative cuvette.

In addition to the display 14 located on the instrument 10 (and preferably the input buttons and/or touchscreen on the instrument 10), the instrument 10 also includes a port 30 (e.g., a USB connection port, Ethernet port, Wifi, etc.) for communication with an external device such as a general purpose computer that would be coupled to the display, such as the one shown in FIGS. 11-12. The instrument 10 can receive instructions from an external device that control the operation of the instrument 10. The instrument 10 can also transmit data (e.g., forward-scatter signal data, test-protocol data, cuvette-assembly data derived from a coded label 170 as shown in FIG. 6, diagnostic data, etc.) from the port 30. The instrument 10 also includes an input power port 32 (e.g., A/C power), which is then converted into a DC power supply 34 for use by the motors, laser, sensors, and displays, etc. One or more printed circuit boards 35 provide the various electronics, processors, and memory for operating the instrument 10.

Figure 5:
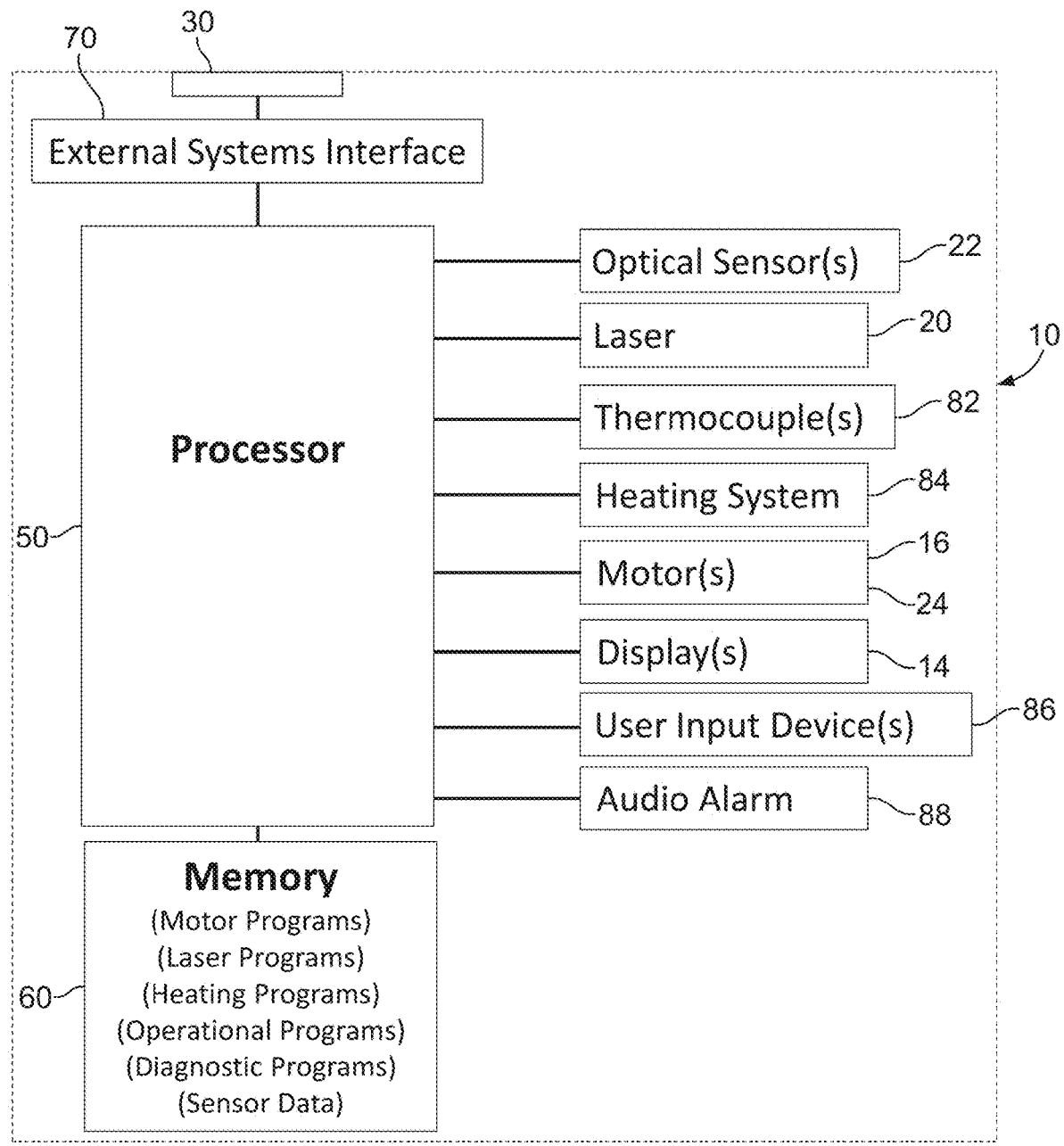
FIG. 5 illustrates a system control diagram for the optical-measuring instrument of FIGS. 1A and 1B.

FIG. 5 illustrates one embodiment for a control system that is located within the instrument 10. The instrument 10 includes one or more printed circuit boards 35 that include at least one processor 50 (and possibly several processors) and at least one memory device 60. The processor 50 communicates with the memory device 60, which includes various programs to operate the motor(s), the laser, the sensors, the heating system, the basic operational functionality, diagnostics, etc. The processor 50 is in communication with the functional components of the instrument 10, such as (1) the optical sensor(s) 22 that sense the forward-scatter signals (or other optical signals, such as fluorescence signals), (2) the laser 20 or other light source that creates the light beam 21 is transmitted into the cuvettes, (3) thermocouple sensors 82 that determine the temperature within the enclosure (or associated with the surface of the cuvette, (4) the heating system 84, such as Kapton heaters, IR heaters, etc., which are preferably placed on the platform or tray 210 (FIG. 8) on which the cuvettes reside, (5) the motors 16, 24 used for opening the door, moving the platform, and moving the optical bench, (6) the display(s) 14 on the front of the instrument, (7) any user input devices 86 (mechanical buttons or touchscreens), and (8) an audio alarm 88 to alert the operator of the instrument to a particular condition or event (e.g., to indicate that one or more samples have reached a certain testing condition, such as a high bacterial concentration, a certain slope in a bacterial-growth curve has been achieved, or a certain forward-scatter signal exceeds a certain value).

The processor 50 is also communicating with an external systems interface 70, such as interface module, associated with the output port 30 on the instrument 10. The primary functions of the processor(s) 50 within the instrument 10 are (i) to maintain the enclosure within the instrument 10 at the appropriate temperature profile (temperature versus time) by use of the thermocouples 82 and heating system 84, (ii) to sequentially actuate the laser 10 so as to provide the necessary input beam 21 into the samples within the cuvette assemblies 110, (iii) to receive and store/transmit the data in the memory device 60 associated with the optical (e.g., forward-scatter) signals from the sensor(s) 22, and (iv) to analyze the forward-scatter signals to determine the amount of or changes in bacterial concentration. Alternatively, the control system or computer module that controls the instrument 10 could be partially located outside the instrument 10. For example, a first processor may be located within the instrument 10 for operating the laser, motors, and heating system, while a second processor outside the instrument 10 handles the data processing/analysis for the forward-scatter signals received by the sensor 22 to determine the amount of or changes in bacterial concentration. The test results (e.g., bacterial concentration indication) and data from the instrument 10 can be reported on the instrument display 14 and/or transmitted by USB, Ethernet, wifi, Bluetooth, or other communication links from the external systems interface 70 within the instrument 10 to external systems that conduct further analysis, reporting, archiving, or aggregation with other data (such as the network 600 in FIG. 19). Preferably, as discussed in more detail relative to FIGS. 19-22, a central database receives test results and data from a plurality of remotely located instruments 10 such that the test data and results (anonymous data/results) can be used to determine trends using analytics, which can then be used to derive better and more robust operational programs for the instrument 10 (e.g., to decrease time per test, or decrease the energy of the tests by used lower incubation temperatures).

Figure 7:
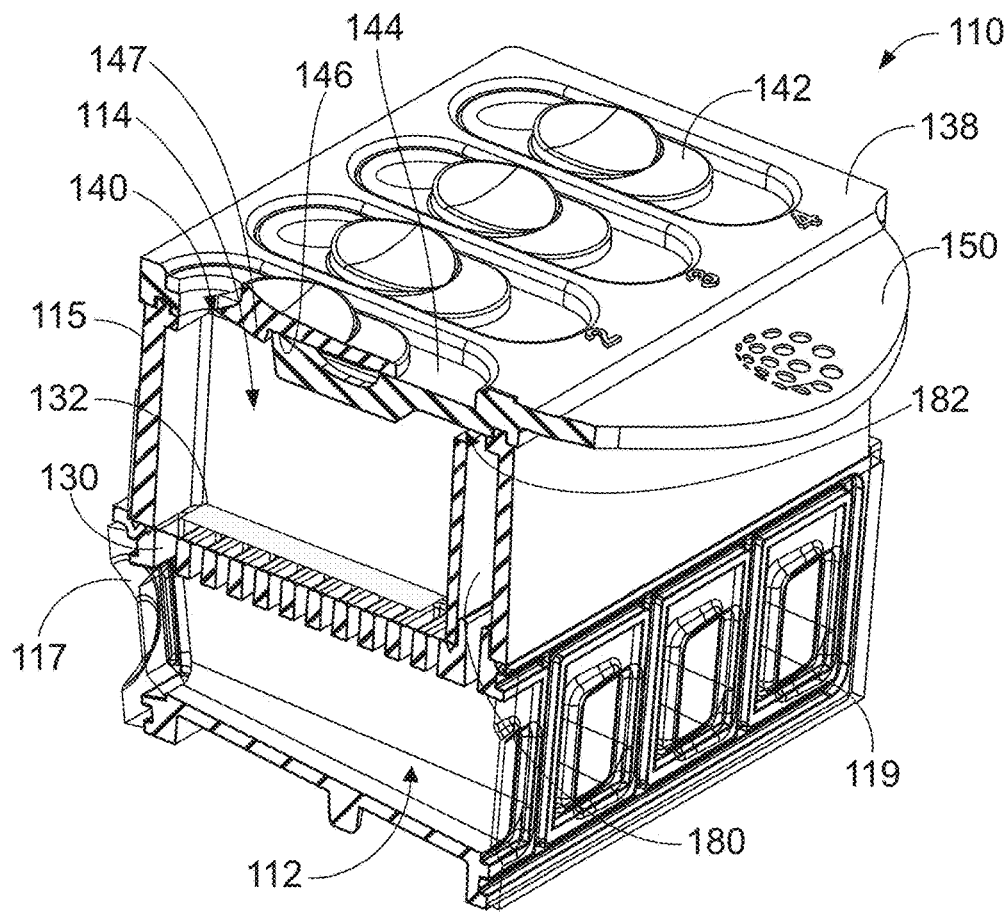
FIG. 7 is a cross-sectional view through one chamber of the multi-chamber cuvette of FIG. 2 that is used with the optical-measuring device of FIGS. 1A and 1B.

Referring to FIGS. 6-7, the cuvette assembly 110 includes four separate cuvettes, each of which includes an optical chamber 112 and a liquid-input chamber 114. The internal and external walls of the lower portion 113 of the main body of the cuvette assembly 110 define the optical chamber 112. For example, the first optical chamber 112 is partially defined by the side external wall, an internal wall, and a bottom wall of the lower portion 113, as well as the entry and exit windows 116, 118. The associated liquid-input chamber 114 is partially defined by a side external wall, an internal wall, and a pair of front and back external walls on the upper portion 115 of the main body of the cuvette assembly 110.

Each of the four entry windows 116 is a part of an entry window assembly 117 that is attached to the lower portion 113 of the main body of the cuvette assembly 110. Similarly, each of the four exit windows 118 is part of an exit window assembly 119 that is attached to the lower portion of the main body opposite the entry window assembly 117. In other words, the present invention contemplates a single unitary optical structure that provides the transmission of the input beam 21 into all four respective optical chambers 112, and a single unitary optical structure that provides for the exit of the forward-scatter signals from the respective optical chambers 112. The lower portion 113 of the main body includes structural recesses that mate with the corresponding structures on the window assemblies 117, 119 for registering them in a proper orientation during assembly of the cuvette assembly 110.

An intermediate partition 130 within the cuvette assembly 110 separates the lower portion 113 defining the four optical chambers 112 from the upper portion 115 defining the liquid-input chambers 114. The intermediate partition 130, which is shown as being part of the lower portion 113 (although it could be part of the upper portion 115), includes four separate groups of openings that permit the flow of liquid from the liquid-input chamber 114 into the associated optical chamber 112. The openings can be a variety of shapes that permit the flow of the liquid. As shown, the openings progressively get longer moving from the entry window 116 to the exit window 118 because the shape of the optical chamber 112 increases in area in the same direction. Additionally, a filter 132 may be used (although not needed, depending on the fluid) and rests upon the intermediate partition 130, such that the same filter 132 is used for each of the four regions. When the same filter 132 is used for all four regions, the interior walls of the upper portion 115 must provide adequate pressure at the filter 132 to prevent crossing fluid flows through the filter 132 between adjacent liquid-input chambers 112. In a further alternative, no filter 132 is present because the intermediate partition 130 includes adequate sized openings to provide the necessary filtering of the liquid sample, or because the liquid samples are pre-filtered before entering each liquid-input chamber 114.

To provide the initial introduction of the liquid samples into the cuvette assembly 110, the upper structure 138, which is attached to the upper portion 115 of the main body of the cuvette assembly 110, includes four openings 140 corresponding to the four liquid-input chambers 114. Four sliding mechanisms 142 are located within four corresponding grooves 144 on the upper structure 138 and are initially placed in an opened position such that the openings 140 are initially accessible to the user for introducing the liquid samples. Each of the sliding mechanisms 142 includes a pair of projections 148 that engage corresponding side channels at the edges of each of the corresponding grooves 144 to permit the sliding action. Within each groove 144, there is a latching ramp 146 over which the sliding mechanism 142 is moved when transitioning to its closed position. A corresponding latch 147 (FIG. 4) on the underside of the sliding mechanism 142 moves over the latching ramp 146 and creates a locking mechanism when the sliding mechanism 142 has been fully moved to the closed position. The upper structure 138 of the cuvette assembly 110 also includes a gripping handle 150 that permits the user to easily grasp the cuvette assembly 110 during transport to and from the platform 210 within the instrument 10 that incorporates the light source 20 and the sensor 22.

To help seal the cuvette assembly 110 after the liquid samples have been placed within the respective liquid-input chambers 114, the periphery of the sliding mechanism 142 adjacent to the opening 140 can be configured to tightly mate with the walls defining the groove 144 (or undercut channels within the groove 144) to inhibit any leakage around the opening 140 in the upper structure 138. Alternatively, a resilient plug-like structure can be located on the underside of the sliding mechanism 142 that fits within the opening 142 create a seal and inhibit leakage. Or, a gasket can be provided around the opening 140 to provide a sealing effect on the underside of the sliding mechanism 142. The cuvette assemblies 110 provide well sealed containment of the samples that reduces evaporation loss.

The upper portion 115 and the lower portion 113 of the main body of the cuvette assembly 110 can be attached to each other through various techniques, such as ultrasonic welding, thermal welding, with adhesive, or through interfering snap-fit connections. Similarly, the upper structure 138 can be attached to the upper portion 115 of the main body through similar techniques. And, the window assemblies 117, 119 can be attached to the lower portion 113 through the same attachment techniques. The width dimension of the overall cuvette assembly 110 across the four cuvettes is roughly 4 cm. The length dimension of the overall cuvette assembly 110 (i.e., parallel to the input beam) is approximately 2 cm. The height dimension of the overall cuvette assembly 110 is approximately 2 cm, such that each of the liquid input chambers 114 is approximately 1 cm in height and each of the optical chambers 112 is approximately 1 cm in height (although the optical chambers 112 have a varying height along the length direction due to their conical shape). In some embodiments, each optical chamber 112 is designed to contain approximately 1.2 to 1.5 cubic centimeters (i.e., approximately 1.2 to 1.5 ml) of a fluid sample. Each liquid-input chamber 114 is designed to hold slightly more of the liquid sample (e.g., 1.7 to 2.5 ml), which is then fed into the corresponding optical chamber 112.

Because each of the cuvette assemblies 110 may be used for different applications, the cuvette assembly 110 may use barcodes or RFID tags to identify the type of test supported by the particular cuvette assembly 110, as well as other measurement data to be taken. The instrument 10 that includes the light source 20 preferably reads the RFID or barcode, and selects the software program with the memory device 60 to run the appropriate optical measurement tests on the cuvette assembly 110. Accordingly, the cuvette assembly 110 preferably includes an identification label 170, which may include barcodes and/or quick response codes ("QR-code") that provide the necessary coded information for the cuvette assembly 110. Other codes can be used as well. Specifically, when bacteria is a particle being checked within the liquid sample, one of the codes on the label 170 may provide the protocol for the test (e.g., temperature profile over duration of test, frequency of the optical measurements, duration of test, etc.), and the processor 50 executes instructions from the memory 60 (FIG. 5) corresponding to the test protocol. Another one of the codes may be associated with information on the patient(s) from whom the liquid samples were taken, which may include some level of encryption to ensure that patient data is kept confidential. Another code may provide a quality-assurance check of the part number or the serial number for the cuvette assembly 110 to ensure that the cuvette assembly 110 is an authentic and genuine part, such that improper cuvettes are not tested. The code for the quality-assurance check may also prevent a cuvette assembly 110 from being tested a second time (perhaps after some type of cleaning) if it is intended for only single use. Again, the instrument 110 preferably includes a device to read the codes associated with the label 170 (such as an image sensor, a barcode reader/sensor, or a QR-code reader/sensor). Alternatively, the codes on the label 170 can be scanned as the assemblies 110 are placed into the platform 210 (FIG. 8) such that the necessary information is obtained prior to the door 12 being closed.

The cuvette assembly 110 also includes a vent 180 (FIG. 7) that extends from the optical chamber 112 into the upper portion 115 of the main body the cuvette assembly 110. The vent 180 includes a chimney-like portion that extends upwardly from the intermediate partition 130. The chimney-like portion is then received in a channel in the upper portion 115, which extends to an opening 182 leading into the liquid-input chamber 114 just below the upper structure 138 that defines the upper boundary of the liquid-input chamber 114. Accordingly, the gas (e.g., air) that is initially present in the optical chamber 112 can be readily displaced as the optical chamber 112 receives the filtered liquid sample from the liquid-input chamber 114 (via the filter 132). The vent 180 can also lead to the external environment on the outside of the cuvette assembly 110.

Figure 8:
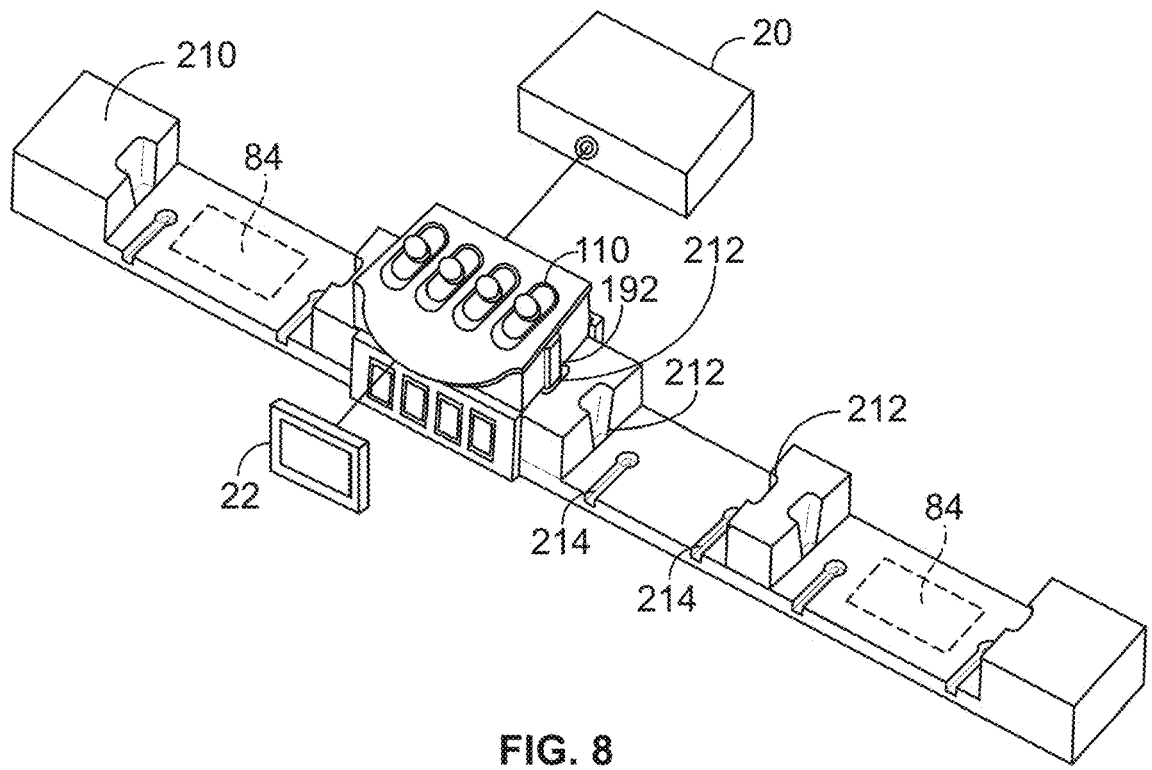
FIG. 8 illustrates the cuvette assembly of FIGS. 2, 6 and 7 registered on a platform or tray (typically heated) that is movable from the open position in which the instrument's door is opened for loading to the closed position in which the instrument's door is closed for sample testing within the optical measurement instrument of FIGS. 1A and 1B.

FIG. 8 illustrates how the cuvettes assemblies 110 are registered with the optical measurement instrument 10 within a registration platform or tray 210, which is a part of the instrument 10. Each of the cuvettes assemblies 110 includes side registration features 192 that undergo a sliding engagement within corresponding vertical grooves 212 on pillars associated with the registration platform 210. Additionally, lower registration features 194 (FIG. 6) can slide within horizontal grooves 214 on an upper surface of the registration platform 210. The horizontal grooves 214 terminate in openings that receive the lower registration features 194 (illustrated as projections) on the cuvette assembly 110. Finally, the distance between the lower segments of the front and back walls of the cuvette assembly 110 corresponds to the width of the registration platform 210 such that cuvette assembly 110 becomes nestled between adjacent pillars with the front and back walls overlying the front and back edges of the registration platform 210.

As can be seen best in FIGS. 6-7, the lower surface of the lower portion 113 of the cuvette assembly 110, which includes the lower registration features 194, is at angle relative to the upper structure 138 of the cuvette assembly 110 and to the input beam from the light source 20 due to the conical geometry of the optical chamber 112. Accordingly, the upper surface of the registration platform 210 is angled in an opposing manner that allows the input beam to be generally horizontal (and generally parallel to the upper structure 138 of the cuvette assembly 110) when the cuvette assembly 110 is placed on the registration platform 210. It should be noted, however, that the cuvette assembly 110 can be properly registered on the registration platform 210 with less than these three distinct registration features illustrated in FIG. 8.

Once the cuvette assembly 110 is nestled properly on the registration platform 210, the door motor 16 is actuated, causing the now-loaded registration platform 210 to be pulled into the instrument 10 and the door 12 to be closed. The light source 20 can then sequentially transmit the input beam through each of the four optical chambers 112 of each cuvette assembly 110 and the forward-scatter signal associated with the particles within each of the liquid samples can be sequentially received by the sensor 22. The light source 20 and the sensor 22 on the optical bench 18 are controllably indexed between positions to receive optical measurements taken in adjacent optical chambers 112. As can be seen in FIG. 8, each platform 210 is capable of receiving four cuvette assemblies 110, such that optical measurements can be taken from sixteen different liquid samples within the four cuvette assemblies 110 nestled on the registration platform 210. Of course, the present invention contemplates an instrument 10 that uses more or less than four cuvettes assemblies 110.

According to this first embodiment, the instrument 10 has the optical beam 21 along a line from the laser 20 (or other light source such as an LED or lamp) and a light/image sensor 22 such as a camera, imager, calorimeter, thermopile, or solid-state detector array. The liquid samples are contained in the optical chambers 112 of the cuvette assemblies 110 between the light source 20 and the sensor 22 with at least one window so that light can transmit through the sample to the sensor 22. The light source 20 producing the optical beam 21 and the sensor 22 are rigidly mounted to a mechanical optical bench 18 (or plate), and the bench 18 is preferably mounted on rails or other mechanical structures for translational motion (or rotational motion) via a stepper motor 24 (or a motorized threaded stage that moves the bench, or a flexible motor-driven belt) so that it can be moved precisely relative to the sample in the cuvette 110 so that multiple samples can be optically measured. Additionally, the bench 18 could be translated to a diagnostic station 90 with no sample present (far right position of the optical bench 18 in FIG. 4) so that it can undergo self-testing or diagnostics in which the sensor 22 confirms performance of the light source 20, and the light source 20 confirms performance of the sensor 22, including provisions of a reticle or other optical devices that can be sensed to confirm alignment or optical power levels.

The sample-containing cuvettes 110 and the optical components are contained in an enclosure within the instrument 10 that excludes most ambient light, which might impact the measurement by the sensor. Alternatively, some portion of the sample cuvette or container could form a light-tight cover on the instrument.

In this first embodiment, the sample-containing cuvettes 110 are disposable containers set on the platform 210 or tray or rail, which preferably includes the heating system 84, such as electrical resistance heaters or pelletier devices and the thermal sensors 82, such as common thermocouples. The heating system 84 and thermal sensors 82 form part of the incubation system that provide for appropriate temperature controls during operation of the instrument 10. The electronic control system in FIG. 5 provides for the thermostatic control of the temperature of the platform 210 and, thus, the contained liquid samples can be warmed or cooled (for example, through fans pulling in cooler air to the enclosure) to a set temperature to influence biological or chemical behavior of the liquid samples. Alternatively, the samples (and cuvettes 110) could be illuminated by optical or infrared (IR) light sources for heating, and the temperature can be measured or implied by direct or remote sensors.

Furthermore, the platform 210 may be equipped with a vibration-producing mechanism to help agitate the samples in the cuvettes 110. For example, a vibration motor can be coupled to the platform and 210 operated between cycles of the laser operation.

FIGS. 9A-9C illustrates an alternative narrow-pitch ("NP") cuvette 310 that can receive samples and be mated with the platform 210 of the optical measuring device 10. The NP cuvette 310 has a pitch (i.e., the distance between center lines of adjacent chambers 312) less than 6 mm, and preferably less than 5 mm. In one embodiment, the pitch is approximately 4.8 mm and there are eight chambers 312 within the cuvette 310. For comparison, the pitch of the cuvette 110 is about twice the pitch of the NP cuvette 310. The NP cuvette 310 has the same type of registration features 394 as the previous cuvettes 110 such that the device 10 can be used with multiple styles of cuvettes 110, 310. Preferably, the code (e.g., a bar code or QR code) on the side of the cuvette 310 indicates that the style of cuvette 310, which then causes the device 10 to operate in a manner wherein the linear movements of the laser 20 and the sensor 20 are altered (here, shortened) to allow measurements from each of the narrower chambers 312.

The NP cuvette 310 also differs from the prior cuvette 110 in that the body of the NP cuvette 310 is preferably molded from a single material that provides for sufficient optical qualities to permit the beam from the laser 20 to enter the chamber 312 and act upon the fluid sample, and to subsequently permit forward scatter signals to exit from the chamber 312. In one embodiment, the material of the NP cuvette 310 is polycarbonate that is formed into the cuvette 310 by a single-shot injection molding process, thereby creating an integral beam-input window and an integral scatter-signal exit window, each having a scratch-dig number of preferably 40/20 or lower. Other optically transparent (e.g., clear polymeric resins) materials may be used include allow the single injection molded process and still provide sufficient optical properties and sterilization by standard methods in the medical industry (gamma; e-beam; autoclave). In alternative embodiment, the cuvette 310 is made by a multi-shot injection molding process in which the walls separating adjacent chambers 312 are formed by (or partially formed by) an opaque material so as to minimize the input beam or forward scatter signals acting upon the sample fluid of an adjacent chamber 312. In another embodiment, one of the two main surfaces of the walls between adjacent chambers 312 may be coated with an opaque material, such as a film. In other words, the cuvette 310 may be a clear polycarbonate throughout the majority of the main body, but with opaque material between adjacent chambers 312.

The NP cuvette 310 also includes a top structure 338 that includes eight openings 340 leading to the eight chambers 312. As shown best in FIG. 9A, the sample fluid directly flows down to the bottom portion of the cuvette 310 (i.e., there is not intermediate partition or filter). The top structure 338 is typically attached to the unitary main body of the NP cuvette 310 through a plastic welding process. The eight openings 340 are sized to fit a tip of a typical pipette tip, such that they are about 2.5 to 3.0 mm in diameter. The openings 340 can be closed by eight individual flexible (e.g., elastomers) plugs 345 that are attached to the top structure 338 via flexible arms 347. The plugs 345 provide a seal-tight fit within the openings 340. Instead of the individual flexible arms 347, the plugs 345 can also be connected via a common structure that rotates to force each of the eight plugs 345 into a sealing engagement within its corresponding opening 340.

The NP cuvette 310 of FIGS. 9A-9C is particularly configured for antibacterial susceptibility testing for a patient's fluid sample. In one optical chamber 312 of the cuvette 310, a liquid sample (e.g., urine from a patient suspected of having a urinary tract infection) may serve as a control for the test with no chemo-effector or antibiotic. The second optical chamber 312 may have the same patient's liquid sample, but mixed with a first antibiotic applied thereto. Similarly, the third through eighth optical chamber 312 may have the same patient's liquid sample, but mixed with other antibiotics. The cuvette assembly 310 provides for a simplistic method for determining the effect of each of the seven antibiotics on the patient by measuring the bacterial content (i.e., bacteria particles) over a period of time. For example, the untreated control sample in the first optical chamber 312 may result in a forward scatter signal that increases due to the growth of bacteria in the untreated liquid sample. But, that same liquid sample from the patient may experience less growth in the number of bacteria or no growth when exposed to one or more of the antibiotics. It should be understood that the same type of antibiotic can be used, but at different concentration levels such that the cuvette assembly 310 is useful in determining the "minimum inhibitory concentration" that is needed to reduce or retard bacterial growth. In short, the cuvette assembly of the present invention is useful in determining the effects of a chemo-effector (such as an antibiotic, or a nutrient growth medium) by allowing for an easy measurement of changes in microbial growth rates for liquid samples exposed to different chemo-effectors or liquid samples exposed to the same chemo-effector, but at different concentrations.

Preferably, the chambers 312 of the cuvette 310 are pre-loaded with different combinations of chemo-effectors (for example, pre-mixed sterile liquid growth media, such as Mueller Hinton Broth or Luria Broth, each with a different concentration of some number of antibiotics) and sealed with a membrane (not shown) on the cuvette. The pre-loaded chemo-effector is preferably in a desiccated or lyophilized form. The user can load a small amount of the liquid sample into each chamber 312 by piercing a sealed membrane, depositing the liquid sample, and removing the pipette or cannula. The chemo-effector sample and liquid sample can mix, and the cuvette assembly 310 can then be measured and incubated in an instrument with the light source 20 and the sensor 22. The different rates of growth of a pathogen could be measured for each chamber that holds variable concentrations of the antibiotic, and a "minimum inhibitory concentration" can be established from these results in a short period. This may be incorporated into a cuvette assembly 310 having chambers with no chemo-effectors, or chambers that do not receive liquid samples but are simply present to provide control or calibration standards for the optical measurements associated with the light source 20 and the sensor 22. In other words, the present invention contemplates an optical chamber in the cuvette assembly as containing a control fluid or a calibration liquid.

With regard to the specific use of a chemo-effectors, a chemo-effector may be a dry (e.g., lyophilized) material, a coating on a surface of one of the chambers, a liquid or solution, a gaseous atmosphere (such as Argon, O2, or CO2), or some combination. In the present invention, the chemo-effector is preferably pre-loaded into the cuvette assembly 310, and closed by one of the internal membranes, films, foils, or other frangible or moveable feature for future use. The chemo-effector may be a growth media combined with an antibiotic and combined with other biochemical reagents. In particular, the chemo-effector could be loaded into the top of the cuvette 310 before the top structure 348 is sealed to the unitary main body and enclosed with a frangible membrane above the chemo-effector (for example, a film or membrane below the top structure 348).

Figure 10:
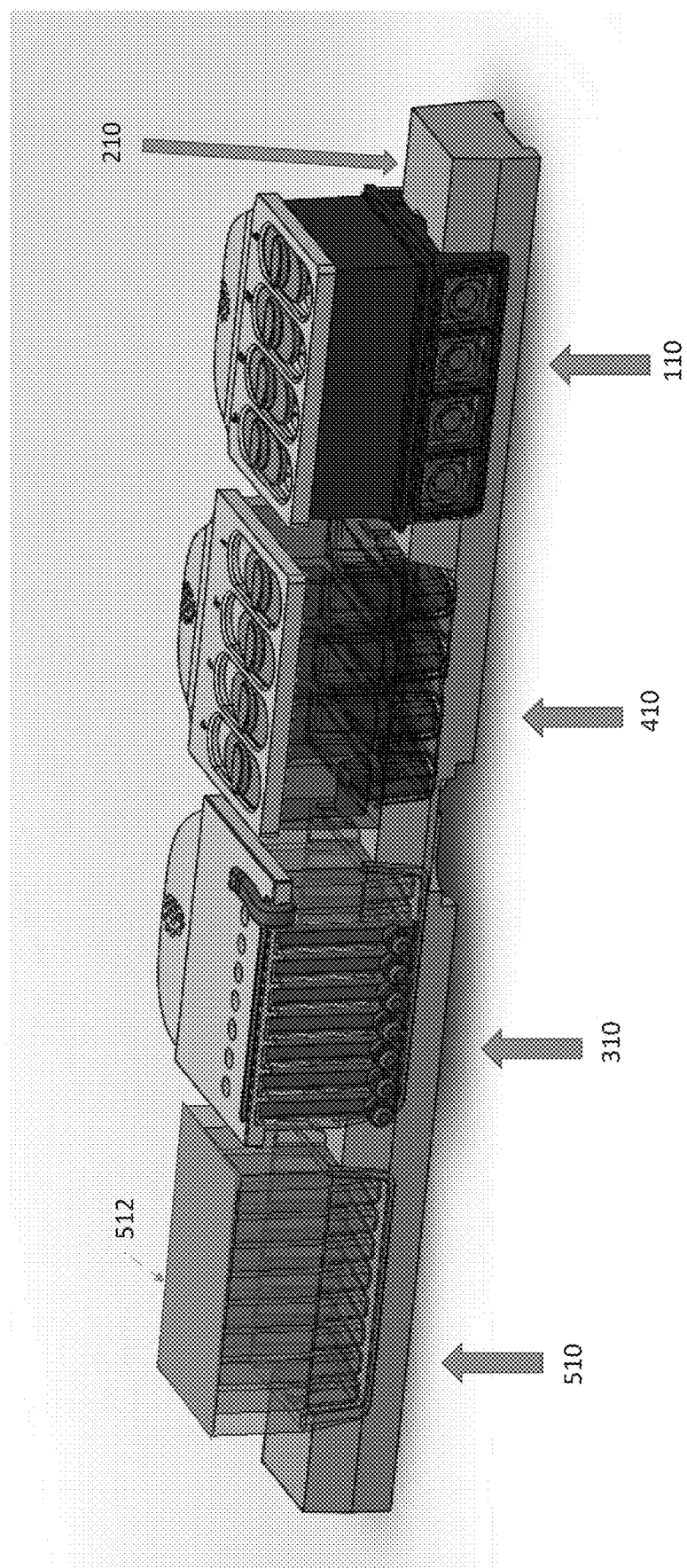
FIG. 10 illustrates the modularity of the device of FIGS. 1-5 being used with multiple cuvette styles.

FIG. 10 illustrates the modularity of the optical measurement instrument 10 of FIGS. 1-5 in that the registration platform 210 can be used with multiple styles of cuvettes. For example, the cuvette 110 of FIGS. 6-7 can be used for testing fluid samples, as can the cuvette 310 of FIGS. 9A-9C. Another cuvette 410 includes a unitary main body with four optical chambers of a transparent material (e.g., polycarbonate) like cuvette 310, but with a top structure having sliding closure mechanisms like cuvette 110. Yet another cuvette 510 includes a unitary main body with eight optical chambers of a transparent material (e.g., polycarbonate) like cuvette 310, but with a frangible foil 512 for sealing the top. The foil 512 could be adhered to the unitary body using an adhesive or by welding. For any of the cuvettes having such a foil seal, the user typically pierces the foil seal using a dispensing mechanism like a pipette tip or a transfer pipette, delivering the liquid sample to the measurement compartment for reconstitution of and/or mixing with pre-loaded chemoeffectors or biological-effectors (such as bacteriophage, discussed below). Loaded samples would then be measured by the laser 20 to assess particle density changes within the sample fluid over time.

In summary, the optical device 10 of FIGS. 1-5 can be used with various types of cuvettes that mate with and are registered on the platform 210 during the same session of forward scatter testing. Under the control of the processor, the laser 20 and sensor 22 would be translated by a distance corresponding to the pitch of a four-chamber cuvette (about 10 mm) or an eight-chamber cuvette (about 5 mm), as the case may be, to receive forward scatter signals from the samples in the various cuvettes 110, 310, 410, 510. Information regarding the type of cuvette positioned in each station on the platform 210 can be manually input or automatically read through a code on the cuvette's outer surface (e.g., QR code or barcode).

FIG. 11 illustrates an alternative cuvette 610 that includes a large number of optical chambers (e.g., 40-48 chambers) relative to the previous cuvettes. The cuvette 610 is preferably made from a transparent optical material (e.g., polycarbonate) via a single injection molding procedure. For a single fluid sample to be tested in all optical chambers, the cuvette 610 preferably includes a manifold 612 that distributes approximately the same amount of sample fluid to each of the optical chambers, which contain various types of antibiotics and/or concentration amounts of antibiotics. The manifold 612 includes a series of channels and/or openings that guide the flow of the sample fluid from the main chamber to each of the optical chambers. The manifold 612 may also include a series of vents to allow air to escape from the optical chamber as fluid begins to fill it. A top structure 614 is coupled to the manifold 612 to permit entry of the single sample via a single opening that communicates with the main chamber of the manifold 612. While the alternative cuvette 610 may have 40-48 chambers, the present invention also contemplates cuvettes with 10 to 40 chambers as well. For example, a cuvette having the same chamber geometry as the eight-chamber cuvette 310 of FIG. 9, but elongated to include 20 chambers would fit on a platform having the size of platform 210 (and usable within the optical measurement instrument 10). In that situation, two 20-chamber cuvettes (40 total chambers) could be tested at the same time within the optical measurement instrument 10. The two 20-chamber cuvettes could be testing two fluid samples.

In some embodiments, to seal the antibiotic in each of the 40-48 chambers, the manifold 612 may include a frangible foil or membrane that inhibits the removal of the antibiotics (preferably powder) from the openings/channels once the antibiotics are placed in the cuvette 610 in a pre-loaded fashion. The cuvette 610 may include a slidable lever on the top surface or side surface of the top structure 614, or the side surface of the manifold 612 that mechanically tears and/or removes the underlying frangible foil or membrane from the openings/channels within the manifold 612. After the operator has actuated the lever (which could occur before or after the fluid enters the manifold 612 via the opening in the top structure 614), the fluid sample in the manifold 612 can flow freely into the individual chambers. In one embodiment, the lever is attached to the foil or membrane, and actuation of the lever moves (e.g., pulls) the foil or membrane away from the openings/channels of the manifold 612, thereby permitting the sample fluid to flow into the chambers of the cuvette 610 via the openings/channels.

The cuvette 610 includes a set registration features (not shown) that allow it to be mated with the registration platform 210 of the optical device 10. The optical device 10 can cause the laser 20 and sensor 22 to translate linearly to periodically measure the forward scatter signal from each chamber. To help minimize the optical effects of adjacent chambers, the inner walls of the cuvette 610 separating optical chambers may include an opaque film or be made of an opaque material, as described above with reference to FIGS. 9A-9C.

FIG. 12 illustrates a comparison of the spatial difference of using the large cuvette 610 in FIG. 11 versus the other types of cuvettes in FIG. 10. The registration platform 210 has a length of approximately 9 inches. When the large cuvette 610 in FIG. 11 is used at least 4 fluid samples per inch (and preferably 5 fluid samples per inch) can be tested via the forward scatter testing technique. Accordingly, a large number of fluid samples can be tested via a device 10 having a very small footprint.

It should be understood that the registration platform 210 of the optical device 10 can be designed to mate with and receive all of the various types of cuvettes in FIGS. 5-12. Alternatively, the registration platform 210 may include a modular mechanical adapter that is used to receive the large cuvette 610 in FIG. 11. As a further alternative, the upstanding structures of the registration platform 210 shown in FIG. 8 between adjacent cuvettes 110 and having the female vertical grooves 212 can be removable from the registration platform 210. Hence, cuvettes of different lengths can be properly mated on the registration platform 210 while having their lowers surfaces engaging the upper support surface of the registration platform 210 and slide within horizontal grooves 214 on the upper support surface of the registration platform 210. The upstanding structures may have lower pegs that fit within holes in the platform 210 so they lift out from the registration platform 210. Screw (or other fasteners) may also be used to hold the modular upstanding structures on the platform 210.

While the cuvettes 110, 310, 410, 510 and 610 have been described for testing a fluid (or fluids) by use of an antibiotic chemoeffector, the cuvettes 110, 310, 410, 510 and 610 can also be used with a biological-effector, such as a bacteriophage for pathogen identification. A bacteriophage is a small, virus-like particle that can inhibit the growth of a target cell and cause lysis in the target cell. The bacteriophage typically binds to the target cell and injects DNA into the target cell. The DNA of the bacteriophage then replicates within the target cell. The target cell then bursts, which releases a plurality of new bacteriophages. The new phages then repeat this process with other target cells. Once the target cells are eliminated, the bacteriophages are naturally cleared.

Bacteriophages are generally naturally-occurring and are routinely found in environment sources. Bacteriophages are often configured such that they only bind to a certain species or genus of microorganism. Their specificity (e.g., the ability to bind with only a single type of microorganism) is generally governed by the particular microorganism surface receptor that they recognize. Moreover, the bacteriophages do not harm or inhibit the growth of types of microorganisms that they are not configured to bind to, or at least not substantially so. In other implementations, types of growth-inhibiting substances other than bacteriophages can be used.

Generally, a microorganism within a fluid sample that is incubated will grow by a first amount or at a first rate when not in the presence of a growth-inhibiting substance configured to interact with that microorganism. However, the same microorganism will grow by a second amount less than the first amount, or at a second rate less than the first rate, when in the presence of a growth-inhibiting substance, such as a bacteriophage, that is configured to interact with that microorganism. In some implementations, the growth-inhibiting substance may completely prevent its corresponding microorganism from growing when incubated, e.g., the second amount or the second rate is substantially zero.

Regarding the testing of a single fluid sample within the cuvettes 110, 310, 410, 510 and 610 mentioned above, different bacteriophages can be placed in different chambers that receive the same fluid sample. Generally, any fluid chamber in which the distinct growth-inhibiting bacteriophage does not match the microorganism in the fluid sample will show microorganism growth (i.e., the bacteriophage does not inhibit or only slightly inhibits the microorganism's growth). Thus, after the incubation process, most of the fluid chambers will contain an increased amount of the microorganism. However, the chamber that contains the specific growth-inhibiting bacteriophage that matches the microorganism in the fluid sample will show no (or little) growth during incubation (i.e. the bacteriophage will inhibit or prohibit inhibits the microorganism's growth). Consequently, the use of distinct microorganism-attracting substances (e.g., bacteriophages) within the various chambers of the cuvettes 110, 310, 410, 510 and 610 allows for simultaneous detection and identification of an unknown microorganisms within the fluid sample, as indicated by repetitive measurements of the forward-scatter signals through the chambers of the cuvette 110, 310, 410, 510 or 610 via the optical measurement device 10 of FIGS. 1-5.

The time-to-result (e.g., notification of bacterial presence in less than three hours) achieved by the cuvette-based systems and methods of FIGS. 1-12 is much better for urine samples than what is known in the art. Urine specimens are a common sample type to be submitted to laboratories for diagnosis of infections. Although the majority of all tested urine specimens prove to be negative by the gold-standard method of plate-based culturing, plate-based culturing takes much more time, usually requiring 24-48 hours to generate results. This often prompts physicians to prescribe empiric antibiotics to patients suspected of having a urinary tract infection (UTI). Diagnostic methods with a more expedited time-to-result have been developed and include both manual dipstick testing and automated urinalysis. Dipstick testing has been granted waived status by the FDA as part of the Clinical Laboratory Improvement Amendments (CLIA) act, while the automated version is typically performed in a set certified by Certified Authorization Professional. In both cases, unprocessed urines are typically evaluated for the presence/absence of blood, glucose, protein, and other biomarkers, some of whose presence has been correlated to a positive specimen indicating a UTI. The two primary markers of UTI-positivity, nitrite and leukocyte esterase, have been clinically demonstrated to have poor sensitivity but high specificity, thus their reliability for discriminating all culture-positive urine specimens is highly suspect.

Laser light-scattering, exemplified by the cuvette-based systems of FIGS. 1-12 (e.g., BacterioScan 216Dx diagnostic instrument marketed by the assignee of the present application), provides a highly-sensitive method for detecting clinically-relevant densities of UTI pathogens directly from urine specimens, with an overall time-to-result of three hours or less. The cuvette-based systems of FIGS. 1-12 are designed to accept the vast majority of clinical specimens without the need for initial processing. This "one size fits all" approach requires utility for both optically-clear and optically-turbid urine specimens, the latter of which can particularly contribute to higher false positive rates and lower specificity of the assay. Consequently, in another aspect of the invention, steps are taken to improve the specificity for fluid samples having a higher turbidity, while also providing equivalently effective performance for non-turbid samples. The vast majority of UTIs are caused by Gram-negative pathogens, particularly by *E. coli*. Gram-negative pathogens differ from Gram-positive ones in several ways, one of which is the presence of an outer membrane encompassing Gram-negative organisms. On the contrary, Gram-positive pathogens are encompassed by a thick cell wall. Chemical dyes, such as crystal violet, have been identified to differentiate these different classes of organisms both at the colony level (e.g., MacConkey agar) and microscopic levels (e.g., Gram stain).

According to this aspect of the invention, the discriminatory capability of a chemical dye (crystal violet in a preferred embodiment) is used by incorporating it into a liquid microbiological medium within certain chambers of the cuvettes 110, 310, 410, 510 and 610 and using forward-angle laser light-scattering of the optical measuring device 10 to differentiate growth in the presence of crystal violet (indicative of Gram-negative bacterial presence) from no-growth in the presence of crystal violet (indicative of Gram-positive bacterial presence). In order to demonstrate that the lack of growth in the presence of crystal violet is attributable to the crystal violet itself, a cognate, no-crystal violet control test is used in one of the adjacent cuvette chambers, consisting solely of the basal microbiological medium without crystal violet supplementation. The comparative analysis of the light-scattering signals of the optical measuring device 10 that result in both the crystal violet-containing sample and crystal violet-lacking sample will enable a high-level identification of the Gram-reactivity of bacteria present in the input sample. If the cuvette chamber with the crystal violet-containing sample has the same or analogous growth as the cognate, crystal violet-lacking chamber as observed over time (typically with the incubation feature of the instrument 10), then the presence of a Gram-negative organism is predicted. On the other hand, if growth is detected in the crystal violet-lacking chamber without any significant growth detected in the cognate crystal violet-containing chamber, then the presence of a Gram-positive organism can be inferred. In other words, the optical measuring device 10 will detect the presence of both Gram-positive and Gram-negative organisms by performing a comparative analysis of the light-scattering signals that result from incubation of both chambers in parallel. In effect, the crystal violet acts as a chemo-effector for Gram-positive organisms because it impedes their ability to divide and grow. This application has utility with sample types that often have increased turbidity, including clinically-relevant biological specimen matrices (i.e., blood, urine, wound exudates, etc.). Though this approach has utility in helping to discriminate organism presence in more turbid samples, it also has equivalent utility for non-turbid samples as well.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A cuvette assembly for use in optically measuring at least one characteristic of particles within a plurality of liquid samples, comprising:
a unitary body made of a single type of transparent material through a single-shot molding process, the unitary body includes a plurality of optical chambers for receiving the liquid sample, an integral entry side wall for allowing transmission of an input light beam into the respective liquid sample, an integral exit side wall for transmitting a forward scatter signal caused by the particles within the respective liquid samples, and integral internal walls, the plurality of optical chambers being separated by the internal walls of the unitary body.

2. The cuvette assembly of claim 1, wherein the transparent material is polycarbonate.

3. The cuvette assembly of claim 1, further including a frangible foil for covering and sealing the unitary body.

4. The cuvette assembly of claim 1, further including an opaque material located on the internal walls separating adjacent optical chambers.

5. The cuvette assembly of claim 1, further including a top structure for mating with and being sealed to the unitary body, the top structure includes a plurality of openings that permit the liquid samples to flow into their respective optical chambers.

6. The cuvette assembly of claim 5, further including a vent associated with each optical chamber to permit the gas within the optical chamber to be displaced as the respective liquid sample enters the optical chamber.

7. The cuvette assembly of claim 5, further including a frangible membrane associated with the top structure to help seal the optical chambers.

8. The cuvette assembly of claim 1, further including different types chemo-effectors or different amounts of the same chemo-effector that are pre-loaded into at least some of the optical chambers.

9. The cuvette assembly of claim 1, further including at least one bacteriophage that is pre-loaded into at least some of the optical chambers.

10. The cuvette assembly of claim 8, further including a frangible membrane for sealing the chemo-effectors in the optical chamber.

11. The cuvette assembly of claim 10, further including a top structure attached to the unitary body, the top structure including a plurality of openings that permit the liquid samples to flow into their respective optical chambers, the frangible membrane being below the top structure and capable of being pierced.

12. The cuvette assembly of claim 11, further including a plurality of individual flexible plugs for fitting within the plurality of openings for sealing the liquid samples in the cuvette assembly.

13. The cuvette assembly of claim 1, wherein the integral entry side wall and the integral exit side wall have a scratch-dig number of 40/20 or lower for transmitting the input light beam and the forward scatter signal, respectively.

14. The cuvette assembly of claim 1, wherein the integral entry side wall and the integral exit side wall are not in a parallel relationship.

15. The cuvette assembly of claim 1, further including a top structure attached to the unitary body, the top structure including an opening that allows the liquid sample to enter the unitary body and be distributed to the plurality of optical chambers.

16. The cuvette assembly of claim 15, further including a manifold below the top structure that distributes the liquid sample to the plurality of optical chambers.

17. The cuvette assembly of claim 1, further including at least registration feature located on a lower side of the unitary body for mating with a structure in an instrument that provides the input light beam.

18. The cuvette assembly of claim 1, wherein the distance between center lines of adjacent ones of the optical chambers is less than 5 mm.

19. The cuvette assembly of claim 18, wherein the number of optical chambers within the unitary body is eight.

20. The cuvette assembly of claim 19, further including a top structure attached to the unitary body, the top structure including eight openings that permit the liquid samples to flow into the eight optical chambers.

* * * * *